United States Patent
Danilov et al.

(10) Patent No.: US 12,015,603 B2
(45) Date of Patent: Jun. 18, 2024

(54) MULTI-TENANT MODE FOR SERVERLESS CODE EXECUTION

(71) Applicant: Amazon Technologies, Inc., Seattle, WA (US)

(72) Inventors: Mikhail Danilov, Sammamish, WA (US); Deepthi Chelupati, Issaquah, WA (US); David Nasi, Seattle, WA (US); Dylan Owen Marriner, Seattle, WA (US); Suganya Rajendran, Bellevue, WA (US); Sean Tyler Myers, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 244 days.

(21) Appl. No.: 17/643,784

(22) Filed: Dec. 10, 2021

(65) Prior Publication Data
US 2023/0188516 A1    Jun. 15, 2023

(51) Int. Cl.
*H04L 29/06* (2006.01)
*G06F 9/50* (2006.01)
*H04L 9/40* (2022.01)

(52) U.S. Cl.
CPC .......... *H04L 63/083* (2013.01); *G06F 9/5077* (2013.01); *H04L 63/20* (2013.01)

(58) Field of Classification Search
None
See application file for complete search history.

(56) References Cited

U.S. PATENT DOCUMENTS

| | | |
|---|---|---|
| 4,949,254 A | 8/1990 | Shorter |
| 5,283,888 A | 2/1994 | Dao et al. |

(Continued)

FOREIGN PATENT DOCUMENTS

| | | |
|---|---|---|
| CA | 2975522 A1 | 8/2016 |
| CN | 1341238 A | 3/2002 |

(Continued)

OTHER PUBLICATIONS

Elsakhawy, Mohamed; Bauer, Michael. FaaS2F: A Framework for Defining Execution-SLA in Serverless Computing. 2020 IEEE Cloud Summit. https://ieeexplore.IEEE.org/stamp/stamp.jsp?tp=&arnumber=9283723 (Year: 2020).*

(Continued)

*Primary Examiner* — Jeremiah L Avery
(74) *Attorney, Agent, or Firm* — Knobbe, Martens, Olson & Bear, LLP

(57) ABSTRACT

Systems and methods are described for a multi-tenant mode of a serverless code execution system. For instance, a method may include maintaining a set of execution environments, wherein each execution environment is associated with a serverless function, wherein the serverless function is associated with a software as a service (SaaS) provider that is a tenant of a cloud services provider, wherein the SaaS provider provides services to sub-tenants, wherein the set of execution environments are partitioned based on sub-tenants of the SaaS provider; receiving a call to execute a serverless function, wherein the call includes a serverless function identifier and a sub-tenant identifier; identifying a sub-tenant-specific execution environment of the set of execution environments that is associated with the sub-tenant; and in response to identifying the tenant-specific execution environment, invoking the serverless function on the sub-tenant-specific execution environment.

20 Claims, 5 Drawing Sheets

(56) References Cited

U.S. PATENT DOCUMENTS

| | | |
|---|---|---|
| 5,835,764 A | 11/1998 | Platt et al. |
| 5,970,488 A | 10/1999 | Crowe et al. |
| 5,983,197 A | 11/1999 | Enta |
| 6,237,005 B1 | 5/2001 | Griffin |
| 6,260,058 B1 | 7/2001 | Hoenninger et al. |
| 6,385,636 B1 | 5/2002 | Suzuki |
| 6,463,509 B1 | 10/2002 | Teoman et al. |
| 6,501,736 B1 | 12/2002 | Smolik et al. |
| 6,523,035 B1 | 2/2003 | Fleming et al. |
| 6,549,936 B1 | 4/2003 | Hirabayashi |
| 6,708,276 B1 | 3/2004 | Yarsa et al. |
| 7,036,121 B1 | 4/2006 | Casabona et al. |
| 7,308,463 B2 | 12/2007 | Taulbee et al. |
| 7,340,522 B1 | 3/2008 | Basu et al. |
| 7,360,215 B2 | 4/2008 | Kraiss et al. |
| 7,558,719 B1 | 7/2009 | Donlin |
| 7,577,722 B1 | 8/2009 | Khandekar et al. |
| 7,590,806 B2 | 9/2009 | Harris et al. |
| 7,640,574 B1 | 12/2009 | Kim et al. |
| 7,665,090 B1 | 2/2010 | Tormasov et al. |
| 7,707,579 B2 | 4/2010 | Rodriguez |
| 7,730,464 B2 | 6/2010 | Trowbridge |
| 7,774,191 B2 | 8/2010 | Berkowitz et al. |
| 7,823,186 B2 | 10/2010 | Pouliot |
| 7,831,464 B1 | 11/2010 | Nichols et al. |
| 7,870,153 B2 | 1/2011 | Croft et al. |
| 7,886,021 B2 | 2/2011 | Scheifler et al. |
| 7,949,677 B2 | 5/2011 | Croft et al. |
| 7,954,150 B2 | 5/2011 | Croft et al. |
| 8,010,679 B2 | 8/2011 | Low et al. |
| 8,010,990 B2 | 8/2011 | Ferguson et al. |
| 8,024,564 B2 | 9/2011 | Bassani et al. |
| 8,046,765 B2 | 10/2011 | Cherkasova et al. |
| 8,051,180 B2 | 11/2011 | Mazzaferri et al. |
| 8,051,266 B2 | 11/2011 | DeVal et al. |
| 8,065,676 B1 | 11/2011 | Sahai et al. |
| 8,065,682 B2 | 11/2011 | Baryshnikov et al. |
| 8,095,931 B1 | 1/2012 | Chen et al. |
| 8,127,284 B2 | 2/2012 | Meijer et al. |
| 8,146,073 B2 | 3/2012 | Sinha |
| 8,166,304 B2 | 4/2012 | Murase et al. |
| 8,171,473 B2 | 5/2012 | Lavin |
| 8,201,026 B1 | 6/2012 | Bornstein et al. |
| 8,209,695 B1 | 6/2012 | Pruyne et al. |
| 8,219,987 B1 | 7/2012 | Vlaovic et al. |
| 8,296,267 B2 | 10/2012 | Cahill et al. |
| 8,321,554 B2 | 11/2012 | Dickinson |
| 8,321,558 B1 | 11/2012 | Sirota et al. |
| 8,336,079 B2 | 12/2012 | Budko et al. |
| 8,352,608 B1 | 1/2013 | Keagy et al. |
| 8,387,075 B1 | 2/2013 | McCann et al. |
| 8,392,558 B1 | 3/2013 | Ahuja et al. |
| 8,402,514 B1 | 3/2013 | Thompson et al. |
| 8,417,723 B1 | 4/2013 | Lissack et al. |
| 8,429,282 B1 | 4/2013 | Ahuja |
| 8,448,165 B1 | 5/2013 | Conover |
| 8,479,195 B2 | 7/2013 | Adams et al. |
| 8,490,088 B2 | 7/2013 | Tang |
| 8,555,281 B1 | 10/2013 | Van Dijk et al. |
| 8,560,699 B1 | 10/2013 | Theimer et al. |
| 8,566,835 B2 | 10/2013 | Wang et al. |
| 8,601,323 B2 | 12/2013 | Tsantilis |
| 8,613,070 B1 | 12/2013 | Borzycki et al. |
| 8,615,589 B1 | 12/2013 | Adogla et al. |
| 8,631,130 B2 | 1/2014 | Jackson |
| 8,667,471 B2 | 3/2014 | Wintergerst et al. |
| 8,677,359 B1 | 3/2014 | Cavage et al. |
| 8,694,996 B2 | 4/2014 | Cawlfield et al. |
| 8,700,768 B2 | 4/2014 | Benari |
| 8,713,093 B1 | 4/2014 | Upadhyay et al. |
| 8,719,415 B1 | 5/2014 | Sirota et al. |
| 8,725,702 B1 | 5/2014 | Raman et al. |
| 8,756,322 B1 | 6/2014 | Lynch |
| 8,756,696 B1 | 6/2014 | Miller |
| 8,763,091 B1 | 6/2014 | Singh et al. |
| 8,769,519 B2 | 7/2014 | Leitman et al. |
| 8,793,676 B2 | 7/2014 | Quinn et al. |
| 8,799,236 B1 | 8/2014 | Azari et al. |
| 8,799,879 B2 | 8/2014 | Wright et al. |
| 8,806,266 B1 | 8/2014 | Qu et al. |
| 8,806,468 B2 | 8/2014 | Meijer et al. |
| 8,806,644 B2 | 8/2014 | McCorkendale et al. |
| 8,819,679 B2 | 8/2014 | Agarwal et al. |
| 8,825,863 B2 | 9/2014 | Hansson et al. |
| 8,825,964 B1 | 9/2014 | Sopka et al. |
| 8,839,035 B1 | 9/2014 | Dimitrovich et al. |
| 8,850,432 B2 | 9/2014 | Mcgrath et al. |
| 8,869,300 B2 | 10/2014 | Singh et al. |
| 8,874,952 B2 | 10/2014 | Tameshige et al. |
| 8,904,008 B2 | 12/2014 | Calder et al. |
| 8,949,457 B1 | 2/2015 | Theroux et al. |
| 8,966,495 B2 | 2/2015 | Kulkarni |
| 8,972,980 B2 | 3/2015 | Banga et al. |
| 8,990,807 B2 | 3/2015 | Wu et al. |
| 8,997,093 B2 | 3/2015 | Dimitrov |
| 9,002,871 B2 | 4/2015 | Bulkowski et al. |
| 9,021,501 B2 | 4/2015 | Li et al. |
| 9,026,658 B2 | 5/2015 | Xu et al. |
| 9,027,087 B2 | 5/2015 | Ishaya et al. |
| 9,038,068 B2 | 5/2015 | Engle et al. |
| 9,052,935 B1 | 6/2015 | Rajaa |
| 9,086,897 B2 | 7/2015 | Oh et al. |
| 9,086,924 B2 | 7/2015 | Barsness et al. |
| 9,092,837 B2 | 7/2015 | Bala et al. |
| 9,098,528 B2 | 8/2015 | Wang |
| 9,104,477 B2 | 8/2015 | Kodialam et al. |
| 9,110,732 B1 | 8/2015 | Forschmiedt et al. |
| 9,110,770 B1 | 8/2015 | Raju et al. |
| 9,111,037 B1 | 8/2015 | Nalis et al. |
| 9,112,813 B2 | 8/2015 | Jackson |
| 9,116,733 B2 | 8/2015 | Banga et al. |
| 9,130,900 B2 | 9/2015 | Tran |
| 9,141,410 B2 | 9/2015 | Leafe et al. |
| 9,146,764 B1 | 9/2015 | Wagner |
| 9,152,406 B2 | 10/2015 | De et al. |
| 9,154,955 B1 | 10/2015 | Bertz et al. |
| 9,164,754 B1 | 10/2015 | Pohlack |
| 9,176,871 B1 | 11/2015 | Serlet |
| 9,183,019 B2 | 11/2015 | Kruglick |
| 9,189,778 B1 | 11/2015 | Sh. Al-Rashidi |
| 9,195,520 B2 | 11/2015 | Turk |
| 9,208,007 B2 | 12/2015 | Harper et al. |
| 9,218,190 B2 | 12/2015 | Anand et al. |
| 9,223,561 B2 | 12/2015 | Orveillon et al. |
| 9,223,966 B1 | 12/2015 | Satish et al. |
| 9,250,893 B2 | 2/2016 | Blahaerath et al. |
| 9,268,586 B2 | 2/2016 | Voccio et al. |
| 9,298,633 B1 | 3/2016 | Zhao et al. |
| 9,317,689 B2 | 4/2016 | Aissi |
| 9,323,556 B2 | 4/2016 | Wagner |
| 9,361,145 B1 | 6/2016 | Wilson et al. |
| 9,405,582 B2 | 8/2016 | Fuller et al. |
| 9,411,645 B1 | 8/2016 | Duan et al. |
| 9,413,626 B2 | 8/2016 | Reque et al. |
| 9,417,918 B2 | 8/2016 | Chin et al. |
| 9,430,290 B1 | 8/2016 | Gupta et al. |
| 9,436,555 B2 | 9/2016 | Dornemann et al. |
| 9,461,996 B2 | 10/2016 | Hayton et al. |
| 9,471,775 B1 | 10/2016 | Wagner et al. |
| 9,471,776 B2 | 10/2016 | Gu et al. |
| 9,483,335 B1 | 11/2016 | Wagner et al. |
| 9,489,227 B2 | 11/2016 | Oh et al. |
| 9,497,136 B1 | 11/2016 | Ramarao et al. |
| 9,501,345 B1 | 11/2016 | Lietz et al. |
| 9,514,037 B1 | 12/2016 | Dow et al. |
| 9,537,788 B2 | 1/2017 | Reque et al. |
| 9,563,613 B1 | 2/2017 | Dinkel et al. |
| 9,565,190 B1 | 2/2017 | Telvik et al. |
| 9,575,798 B2 | 2/2017 | Terayama et al. |
| 9,588,790 B1 | 3/2017 | Wagner et al. |
| 9,594,590 B2 | 3/2017 | Hsu |
| 9,596,350 B1 | 3/2017 | Dymshyts et al. |
| 9,600,312 B2 | 3/2017 | Wagner et al. |
| 9,613,127 B1 | 4/2017 | Rus et al. |

(56) References Cited

U.S. PATENT DOCUMENTS

| | | |
|---|---|---|
| 9,626,204 B1 | 4/2017 | Banga et al. |
| 9,628,332 B2 | 4/2017 | Bruno, Jr. et al. |
| 9,635,132 B1 | 4/2017 | Lin et al. |
| 9,652,306 B1 | 5/2017 | Wagner et al. |
| 9,652,617 B1 | 5/2017 | Evans et al. |
| 9,654,508 B2 | 5/2017 | Barton et al. |
| 9,661,011 B1 | 5/2017 | Van Horenbeeck et al. |
| 9,678,773 B1 | 6/2017 | Wagner et al. |
| 9,678,778 B1 | 6/2017 | Youseff |
| 9,703,681 B2 | 7/2017 | Taylor et al. |
| 9,715,402 B2 | 7/2017 | Wagner et al. |
| 9,720,661 B2 | 8/2017 | Gschwind et al. |
| 9,720,662 B2 | 8/2017 | Gschwind et al. |
| 9,727,725 B2 | 8/2017 | Wagner et al. |
| 9,733,967 B2 | 8/2017 | Wagner et al. |
| 9,760,387 B2 | 9/2017 | Wagner et al. |
| 9,760,443 B2 | 9/2017 | Tarasuk-Levin et al. |
| 9,767,271 B2 | 9/2017 | Ghose |
| 9,785,476 B2 | 10/2017 | Wagner et al. |
| 9,787,779 B2 | 10/2017 | Frank et al. |
| 9,798,831 B2 | 10/2017 | Chattopadhyay et al. |
| 9,799,017 B1 | 10/2017 | Vermeulen et al. |
| 9,811,363 B1 | 11/2017 | Wagner |
| 9,811,434 B1 | 11/2017 | Wagner |
| 9,817,695 B2 | 11/2017 | Clark |
| 9,830,175 B1 | 11/2017 | Wagner |
| 9,830,193 B1 | 11/2017 | Wagner et al. |
| 9,830,449 B1 | 11/2017 | Wagner |
| 9,864,636 B1 | 1/2018 | Patel et al. |
| 9,898,393 B2 | 2/2018 | Moorthi et al. |
| 9,910,713 B2 | 3/2018 | Wisniewski et al. |
| 9,921,864 B2 | 3/2018 | Singaravelu et al. |
| 9,928,108 B1 | 3/2018 | Wagner et al. |
| 9,929,916 B1 | 3/2018 | Subramanian et al. |
| 9,930,103 B2 | 3/2018 | Thompson |
| 9,930,133 B2 | 3/2018 | Susarla et al. |
| 9,952,896 B2 | 4/2018 | Wagner et al. |
| 9,977,691 B2 | 5/2018 | Marriner et al. |
| 9,979,817 B2 | 5/2018 | Huang et al. |
| 9,983,982 B1 | 5/2018 | Kumar et al. |
| 10,002,026 B1 | 6/2018 | Wagner |
| 10,002,036 B2 | 6/2018 | Fuchs et al. |
| 10,013,267 B1 | 7/2018 | Wagner et al. |
| 10,042,660 B2 | 8/2018 | Wagner et al. |
| 10,048,974 B1 | 8/2018 | Wagner et al. |
| 10,061,613 B1 | 8/2018 | Brooker et al. |
| 10,067,801 B1 | 9/2018 | Wagner |
| 10,102,040 B2 | 10/2018 | Marriner et al. |
| 10,108,443 B2 | 10/2018 | Wagner et al. |
| 10,139,876 B2 | 11/2018 | Lu et al. |
| 10,140,137 B2 | 11/2018 | Wagner |
| 10,146,635 B1 | 12/2018 | Chai et al. |
| 10,162,655 B2 | 12/2018 | Tuch et al. |
| 10,162,672 B2 | 12/2018 | Wagner et al. |
| 10,162,688 B2 | 12/2018 | Wagner |
| 10,191,861 B1 | 1/2019 | Steinberg |
| 10,193,839 B2 | 1/2019 | Tandon et al. |
| 10,198,298 B2 | 2/2019 | Bishop et al. |
| 10,203,990 B2 | 2/2019 | Wagner et al. |
| 10,248,467 B2 | 4/2019 | Wisniewski et al. |
| 10,255,090 B2 | 4/2019 | Tuch et al. |
| 10,277,708 B2 | 4/2019 | Wagner et al. |
| 10,282,229 B2 | 5/2019 | Wagner et al. |
| 10,303,492 B1 | 5/2019 | Wagner et al. |
| 10,331,462 B1 | 6/2019 | Varda et al. |
| 10,346,625 B2 | 7/2019 | Anderson et al. |
| 10,353,678 B1 | 7/2019 | Wagner |
| 10,353,746 B2 | 7/2019 | Reque et al. |
| 10,360,025 B2 | 7/2019 | Foskett et al. |
| 10,360,067 B1 | 7/2019 | Wagner |
| 10,365,985 B2 | 7/2019 | Wagner |
| 10,387,177 B2 | 8/2019 | Wagner et al. |
| 10,402,231 B2 | 9/2019 | Marriner et al. |
| 10,423,158 B1 | 9/2019 | Hadlich |
| 10,437,629 B2 | 10/2019 | Wagner et al. |
| 10,445,140 B1 | 10/2019 | Sagar et al. |
| 10,459,822 B1 | 10/2019 | Gondi |
| 10,496,547 B1 | 12/2019 | Naenko et al. |
| 10,503,626 B2 | 12/2019 | Idicula et al. |
| 10,528,390 B2 | 1/2020 | Brooker et al. |
| 10,531,226 B1 | 1/2020 | Wang et al. |
| 10,552,193 B2 | 2/2020 | Wagner et al. |
| 10,552,442 B1 | 2/2020 | Lusk et al. |
| 10,564,946 B1 | 2/2020 | Wagner et al. |
| 10,572,375 B1 | 2/2020 | Wagner |
| 10,592,269 B2 | 3/2020 | Wagner et al. |
| 10,608,973 B2 | 3/2020 | Kuo et al. |
| 10,615,984 B1 | 4/2020 | Wang |
| 10,623,476 B2 | 4/2020 | Thompson |
| 10,637,817 B2 | 4/2020 | Kuo et al. |
| 10,649,749 B1 | 5/2020 | Brooker et al. |
| 10,649,792 B1 | 5/2020 | Kulchytskyy et al. |
| 10,650,156 B2 | 5/2020 | Anderson et al. |
| 10,652,350 B2 | 5/2020 | Wozniak |
| 10,678,522 B1 | 6/2020 | Yerramreddy et al. |
| 10,686,605 B2 | 6/2020 | Chhabra et al. |
| 10,691,498 B2 | 6/2020 | Wagner |
| 10,713,080 B1 | 7/2020 | Brooker et al. |
| 10,719,367 B1 | 7/2020 | Kim et al. |
| 10,725,752 B1 | 7/2020 | Wagner et al. |
| 10,725,826 B1 | 7/2020 | Sagar et al. |
| 10,732,951 B2 | 8/2020 | Jayanthi et al. |
| 10,733,085 B1 | 8/2020 | Wagner |
| 10,754,701 B1 | 8/2020 | Wagner |
| 10,776,091 B1 | 9/2020 | Wagner et al. |
| 10,776,171 B2 | 9/2020 | Wagner et al. |
| 10,817,331 B2 | 10/2020 | Mullen et al. |
| 10,817,346 B1 * | 10/2020 | Culp ............... G06F 21/6218 |
| 10,824,484 B2 | 11/2020 | Wagner et al. |
| 10,831,898 B1 | 11/2020 | Wagner |
| 10,846,117 B1 | 11/2020 | Steinberg |
| 10,853,112 B2 | 12/2020 | Wagner et al. |
| 10,853,115 B2 | 12/2020 | Mullen et al. |
| 10,884,722 B2 | 1/2021 | Brooker et al. |
| 10,884,787 B1 | 1/2021 | Wagner et al. |
| 10,884,802 B2 | 1/2021 | Wagner et al. |
| 10,884,812 B2 | 1/2021 | Brooker et al. |
| 10,891,145 B2 | 1/2021 | Wagner et al. |
| 10,915,371 B2 | 2/2021 | Wagner et al. |
| 10,942,795 B1 | 3/2021 | Yanacek et al. |
| 10,949,237 B2 | 3/2021 | Piwonka et al. |
| 10,956,185 B2 | 3/2021 | Wagner |
| 10,956,244 B1 | 3/2021 | Cho |
| 11,010,188 B1 | 5/2021 | Brooker et al. |
| 11,016,815 B2 | 5/2021 | Wisniewski et al. |
| 11,044,198 B1 | 6/2021 | Ahn et al. |
| 11,082,333 B1 | 8/2021 | Lam et al. |
| 11,095,706 B1 * | 8/2021 | Ankam ............... H04L 67/51 |
| 11,099,870 B1 | 8/2021 | Brooker et al. |
| 11,099,917 B2 | 8/2021 | Hussels et al. |
| 11,115,404 B2 | 9/2021 | Siefker et al. |
| 11,119,809 B1 | 9/2021 | Brooker et al. |
| 11,119,813 B1 | 9/2021 | Kasaragod |
| 11,119,826 B2 | 9/2021 | Yanacek et al. |
| 11,126,469 B2 | 9/2021 | Reque et al. |
| 11,132,213 B1 | 9/2021 | Wagner |
| 11,146,569 B1 | 10/2021 | Brooker et al. |
| 11,159,528 B2 | 10/2021 | Siefker et al. |
| 11,188,391 B1 | 11/2021 | Sule |
| 11,190,609 B2 | 11/2021 | Siefker et al. |
| 11,231,955 B1 | 1/2022 | Shahane et al. |
| 11,243,819 B1 | 2/2022 | Wagner |
| 11,243,953 B2 | 2/2022 | Wagner et al. |
| 11,263,034 B2 | 3/2022 | Wagner et al. |
| 11,327,992 B1 | 5/2022 | Batsakis et al. |
| 11,354,169 B2 | 6/2022 | Marriner et al. |
| 11,360,793 B2 | 6/2022 | Wagner et al. |
| 11,392,497 B1 | 7/2022 | Brooker et al. |
| 11,461,124 B2 | 10/2022 | Wagner et al. |
| 11,467,890 B2 | 10/2022 | Wagner |
| 11,550,713 B1 | 1/2023 | Piwonka et al. |
| 11,561,811 B2 | 1/2023 | Wagner |
| 11,593,270 B1 | 2/2023 | Brooker et al. |
| 11,714,675 B2 | 8/2023 | Brooker et al. |

(56) References Cited

U.S. PATENT DOCUMENTS

| | | |
|---|---|---|
| 2001/0044817 A1 | 11/2001 | Asano et al. |
| 2002/0083012 A1 | 6/2002 | Bush et al. |
| 2002/0120685 A1 | 8/2002 | Srivastava et al. |
| 2002/0172273 A1 | 11/2002 | Baker et al. |
| 2003/0071842 A1 | 4/2003 | King et al. |
| 2003/0084434 A1 | 5/2003 | Ren |
| 2003/0149801 A1 | 8/2003 | Kushnirskiy |
| 2003/0177186 A1 | 9/2003 | Goodman et al. |
| 2003/0191795 A1 | 10/2003 | Bernardin et al. |
| 2003/0208569 A1 | 11/2003 | O'Brien et al. |
| 2003/0229794 A1 | 12/2003 | James, II et al. |
| 2004/0003087 A1 | 1/2004 | Chambliss et al. |
| 2004/0019886 A1 | 1/2004 | Berent et al. |
| 2004/0044721 A1 | 3/2004 | Song et al. |
| 2004/0049768 A1 | 3/2004 | Matsuyama et al. |
| 2004/0098154 A1 | 5/2004 | McCarthy |
| 2004/0158551 A1 | 8/2004 | Santosuosso |
| 2004/0205493 A1 | 10/2004 | Simpson et al. |
| 2004/0249947 A1 | 12/2004 | Novaes et al. |
| 2004/0268358 A1 | 12/2004 | Darling et al. |
| 2005/0027611 A1 | 2/2005 | Wharton |
| 2005/0044301 A1 | 2/2005 | Vasilevsky et al. |
| 2005/0120160 A1 | 6/2005 | Plouffe et al. |
| 2005/0132167 A1 | 6/2005 | Longobardi |
| 2005/0132368 A1 | 6/2005 | Sexton et al. |
| 2005/0149535 A1 | 7/2005 | Frey et al. |
| 2005/0193113 A1 | 9/2005 | Kokusho et al. |
| 2005/0193283 A1 | 9/2005 | Reinhardt et al. |
| 2005/0237948 A1 | 10/2005 | Wan et al. |
| 2005/0257051 A1 | 11/2005 | Richard |
| 2005/0262183 A1 | 11/2005 | Colrain et al. |
| 2005/0262512 A1 | 11/2005 | Schmidt et al. |
| 2006/0010440 A1 | 1/2006 | Anderson et al. |
| 2006/0015740 A1 | 1/2006 | Kramer |
| 2006/0031448 A1 | 2/2006 | Chu et al. |
| 2006/0036941 A1 | 2/2006 | Neil |
| 2006/0080678 A1 | 4/2006 | Bailey et al. |
| 2006/0123066 A1 | 6/2006 | Jacobs et al. |
| 2006/0129684 A1 | 6/2006 | Datta |
| 2006/0155800 A1 | 7/2006 | Matsumoto |
| 2006/0168174 A1 | 7/2006 | Gebhart et al. |
| 2006/0184669 A1 | 8/2006 | Vaidyanathan et al. |
| 2006/0200668 A1 | 9/2006 | Hybre et al. |
| 2006/0212332 A1 | 9/2006 | Jackson |
| 2006/0218601 A1 | 9/2006 | Michel |
| 2006/0242647 A1 | 10/2006 | Kimbrel et al. |
| 2006/0242709 A1 | 10/2006 | Seinfeld et al. |
| 2006/0248195 A1 | 11/2006 | Toumura et al. |
| 2006/0259763 A1 | 11/2006 | Cooperstein et al. |
| 2006/0282330 A1 | 12/2006 | Frank et al. |
| 2006/0288120 A1 | 12/2006 | Hoshino et al. |
| 2007/0033085 A1 | 2/2007 | Johnson |
| 2007/0050779 A1 | 3/2007 | Hayashi |
| 2007/0067321 A1 | 3/2007 | Bissett et al. |
| 2007/0076244 A1 | 4/2007 | Suzuki et al. |
| 2007/0094396 A1 | 4/2007 | Takano et al. |
| 2007/0101325 A1 | 5/2007 | Bystricky et al. |
| 2007/0112864 A1 | 5/2007 | Ben-Natan |
| 2007/0130341 A1 | 6/2007 | Ma |
| 2007/0174419 A1 | 7/2007 | O'Connell et al. |
| 2007/0180449 A1 | 8/2007 | Croft et al. |
| 2007/0180450 A1 | 8/2007 | Croft et al. |
| 2007/0180493 A1 | 8/2007 | Croft et al. |
| 2007/0186212 A1 | 8/2007 | Mazzaferri et al. |
| 2007/0192082 A1 | 8/2007 | Gaos et al. |
| 2007/0192329 A1 | 8/2007 | Croft et al. |
| 2007/0198656 A1 | 8/2007 | Mazzaferri et al. |
| 2007/0199000 A1 | 8/2007 | Shekhel et al. |
| 2007/0220009 A1 | 9/2007 | Morris et al. |
| 2007/0226700 A1 | 9/2007 | Gal et al. |
| 2007/0240160 A1 | 10/2007 | Paterson-Jones |
| 2007/0255604 A1 | 11/2007 | Seelig |
| 2007/0300297 A1 | 12/2007 | Dawson et al. |
| 2008/0028409 A1 | 1/2008 | Cherkasova et al. |
| 2008/0052401 A1 | 2/2008 | Bugenhagen et al. |
| 2008/0052725 A1 | 2/2008 | Stoodley et al. |
| 2008/0082977 A1 | 4/2008 | Araujo et al. |
| 2008/0104247 A1 | 5/2008 | Venkatakrishnan et al. |
| 2008/0104608 A1 | 5/2008 | Hyser et al. |
| 2008/0115143 A1 | 5/2008 | Shimizu et al. |
| 2008/0126110 A1 | 5/2008 | Haeberle et al. |
| 2008/0126486 A1 | 5/2008 | Heist |
| 2008/0127125 A1 | 5/2008 | Anckaert et al. |
| 2008/0147893 A1 | 6/2008 | Marripudi et al. |
| 2008/0178278 A1 | 7/2008 | Grinstein et al. |
| 2008/0184340 A1 | 7/2008 | Nakamura et al. |
| 2008/0189468 A1 | 8/2008 | Schmidt et al. |
| 2008/0195369 A1 | 8/2008 | Duyanovich et al. |
| 2008/0201568 A1 | 8/2008 | Quinn et al. |
| 2008/0201711 A1 | 8/2008 | Amir Husain |
| 2008/0209423 A1 | 8/2008 | Hirai |
| 2008/0244547 A1 | 10/2008 | Wintergerst et al. |
| 2008/0288940 A1 | 11/2008 | Adams et al. |
| 2008/0307098 A1 | 12/2008 | Kelly |
| 2009/0006897 A1 | 1/2009 | Sarsfield |
| 2009/0013153 A1 | 1/2009 | Hilton |
| 2009/0018892 A1 | 1/2009 | Grey et al. |
| 2009/0025009 A1 | 1/2009 | Brunswig et al. |
| 2009/0034537 A1 | 2/2009 | Colrain et al. |
| 2009/0055810 A1 | 2/2009 | Kondur |
| 2009/0055829 A1 | 2/2009 | Gibson |
| 2009/0070355 A1 | 3/2009 | Cadarette et al. |
| 2009/0077569 A1 | 3/2009 | Appleton et al. |
| 2009/0125902 A1 | 5/2009 | Ghosh et al. |
| 2009/0158275 A1 | 6/2009 | Wang et al. |
| 2009/0158407 A1 | 6/2009 | Nicodemus et al. |
| 2009/0177860 A1 | 7/2009 | Zhu et al. |
| 2009/0183162 A1 | 7/2009 | Kindel et al. |
| 2009/0193410 A1 | 7/2009 | Arthursson et al. |
| 2009/0198769 A1 | 8/2009 | Keller et al. |
| 2009/0204960 A1 | 8/2009 | Ben-Yehuda et al. |
| 2009/0204964 A1 | 8/2009 | Foley et al. |
| 2009/0222922 A1 | 9/2009 | Sidiroglou et al. |
| 2009/0271472 A1 | 10/2009 | Scheifler et al. |
| 2009/0288084 A1 | 11/2009 | Astete et al. |
| 2009/0300151 A1 | 12/2009 | Friedman et al. |
| 2009/0300599 A1 | 12/2009 | Piotrowski |
| 2009/0307430 A1 | 12/2009 | Bruening et al. |
| 2010/0023940 A1 | 1/2010 | Iwamatsu et al. |
| 2010/0031274 A1 | 2/2010 | Sim-Tang |
| 2010/0031325 A1 | 2/2010 | Maigne et al. |
| 2010/0036925 A1 | 2/2010 | Haffner |
| 2010/0037031 A1 | 2/2010 | DeSantis et al. |
| 2010/0058342 A1 | 3/2010 | Machida |
| 2010/0058351 A1 | 3/2010 | Yahagi |
| 2010/0064299 A1 | 3/2010 | Kacin et al. |
| 2010/0070678 A1 | 3/2010 | Zhang et al. |
| 2010/0070725 A1 | 3/2010 | Prahlad et al. |
| 2010/0083048 A1 | 4/2010 | Calinoiu et al. |
| 2010/0083248 A1 | 4/2010 | Wood et al. |
| 2010/0094816 A1 | 4/2010 | Groves, Jr. et al. |
| 2010/0106926 A1 | 4/2010 | Kandasamy et al. |
| 2010/0114825 A1 | 5/2010 | Siddegowda |
| 2010/0115098 A1 | 5/2010 | De Baer et al. |
| 2010/0122343 A1 | 5/2010 | Ghosh |
| 2010/0131936 A1 | 5/2010 | Cheriton |
| 2010/0131959 A1 | 5/2010 | Spiers et al. |
| 2010/0146004 A1 | 6/2010 | Sim-Tang |
| 2010/0169477 A1 | 7/2010 | Stienhans et al. |
| 2010/0186011 A1 | 7/2010 | Magenheimer |
| 2010/0198972 A1 | 8/2010 | Umbehocker |
| 2010/0199285 A1 | 8/2010 | Medovich |
| 2010/0257116 A1 | 10/2010 | Mehta et al. |
| 2010/0257269 A1 | 10/2010 | Clark |
| 2010/0269109 A1 | 10/2010 | Cartales |
| 2010/0298011 A1 | 11/2010 | Pelley et al. |
| 2010/0299541 A1 | 11/2010 | Ishikawa et al. |
| 2010/0312871 A1 | 12/2010 | Desantis et al. |
| 2010/0325727 A1 | 12/2010 | Neystadt et al. |
| 2010/0329149 A1 | 12/2010 | Singh et al. |
| 2010/0329643 A1 | 12/2010 | Kuang |
| 2011/0004687 A1 | 1/2011 | Takemura |
| 2011/0010690 A1 | 1/2011 | Howard et al. |
| 2011/0010722 A1 | 1/2011 | Matsuyama |

(56) References Cited

U.S. PATENT DOCUMENTS

| | | |
|---|---|---|
| 2011/0023026 A1 | 1/2011 | Oza |
| 2011/0029970 A1 | 2/2011 | Arasaratnam |
| 2011/0029984 A1 | 2/2011 | Norman et al. |
| 2011/0035785 A1 | 2/2011 | Mihara |
| 2011/0040812 A1 | 2/2011 | Phillips |
| 2011/0055378 A1 | 3/2011 | Ferris et al. |
| 2011/0055396 A1 | 3/2011 | DeHaan |
| 2011/0055683 A1 | 3/2011 | Jiang |
| 2011/0078679 A1 | 3/2011 | Bozek et al. |
| 2011/0099204 A1 | 4/2011 | Thaler |
| 2011/0099551 A1 | 4/2011 | Fahrig et al. |
| 2011/0131572 A1 | 6/2011 | Elyashev et al. |
| 2011/0134761 A1 | 6/2011 | Smith |
| 2011/0141124 A1 | 6/2011 | Halls et al. |
| 2011/0153541 A1 | 6/2011 | Koch et al. |
| 2011/0153727 A1 | 6/2011 | Li |
| 2011/0153838 A1 | 6/2011 | Belkine et al. |
| 2011/0154353 A1 | 6/2011 | Theroux et al. |
| 2011/0173637 A1 | 7/2011 | Brandwine et al. |
| 2011/0179162 A1 | 7/2011 | Mayo et al. |
| 2011/0184993 A1 | 7/2011 | Chawla et al. |
| 2011/0208866 A1 | 8/2011 | Marmolejo-Meillon et al. |
| 2011/0225277 A1 | 9/2011 | Freimuth et al. |
| 2011/0231680 A1 | 9/2011 | Padmanabhan et al. |
| 2011/0247005 A1 | 10/2011 | Benedetti et al. |
| 2011/0258603 A1 | 10/2011 | Wisnovsky et al. |
| 2011/0265067 A1 | 10/2011 | Schulte et al. |
| 2011/0265069 A1 | 10/2011 | Fee et al. |
| 2011/0265164 A1 | 10/2011 | Lucovsky |
| 2011/0271276 A1 | 11/2011 | Ashok et al. |
| 2011/0276945 A1 | 11/2011 | Chasman et al. |
| 2011/0276963 A1 | 11/2011 | Wu et al. |
| 2011/0296412 A1 | 12/2011 | Banga et al. |
| 2011/0314465 A1 | 12/2011 | Smith et al. |
| 2011/0321033 A1 | 12/2011 | Kelkar et al. |
| 2011/0321051 A1 | 12/2011 | Rastogi |
| 2012/0011496 A1 | 1/2012 | Shimamura |
| 2012/0011511 A1 | 1/2012 | Horvitz et al. |
| 2012/0016721 A1 | 1/2012 | Weinman |
| 2012/0041970 A1 | 2/2012 | Ghosh et al. |
| 2012/0054744 A1 | 3/2012 | Singh et al. |
| 2012/0060207 A1 | 3/2012 | Mardikar et al. |
| 2012/0072762 A1 | 3/2012 | Atchison et al. |
| 2012/0072914 A1 | 3/2012 | Ota |
| 2012/0072920 A1 | 3/2012 | Kawamura |
| 2012/0079004 A1 | 3/2012 | Herman |
| 2012/0096271 A1 | 4/2012 | Ramarathinam et al. |
| 2012/0096468 A1 | 4/2012 | Chakravorty et al. |
| 2012/0102307 A1 | 4/2012 | Wong |
| 2012/0102333 A1 | 4/2012 | Wong |
| 2012/0102481 A1 | 4/2012 | Mani et al. |
| 2012/0102493 A1 | 4/2012 | Allen et al. |
| 2012/0110155 A1 | 5/2012 | Adlung et al. |
| 2012/0110164 A1 | 5/2012 | Frey et al. |
| 2012/0110570 A1 | 5/2012 | Jacobson et al. |
| 2012/0110588 A1 | 5/2012 | Bieswanger et al. |
| 2012/0110603 A1 | 5/2012 | Kaneko et al. |
| 2012/0124563 A1 | 5/2012 | Chung et al. |
| 2012/0131379 A1 | 5/2012 | Tameshige et al. |
| 2012/0144290 A1 | 6/2012 | Goldman et al. |
| 2012/0166624 A1 | 6/2012 | Suit et al. |
| 2012/0173709 A1 | 7/2012 | Li et al. |
| 2012/0192184 A1 | 7/2012 | Burckart et al. |
| 2012/0197795 A1 | 8/2012 | Campbell et al. |
| 2012/0197958 A1 | 8/2012 | Nightingale et al. |
| 2012/0198442 A1 | 8/2012 | Kashyap et al. |
| 2012/0198514 A1 | 8/2012 | McCune et al. |
| 2012/0204164 A1 | 8/2012 | Castanos et al. |
| 2012/0209947 A1 | 8/2012 | Glaser et al. |
| 2012/0222038 A1 | 8/2012 | Katragadda et al. |
| 2012/0233464 A1 | 9/2012 | Miller et al. |
| 2012/0254193 A1 | 10/2012 | Chattopadhyay et al. |
| 2012/0324052 A1 | 12/2012 | Paleja et al. |
| 2012/0324236 A1 | 12/2012 | Srivastava et al. |
| 2012/0331113 A1 | 12/2012 | Jain et al. |
| 2013/0014101 A1 | 1/2013 | Ballani et al. |
| 2013/0042234 A1 | 2/2013 | DeLuca et al. |
| 2013/0054804 A1 | 2/2013 | Jana et al. |
| 2013/0054927 A1 | 2/2013 | Raj et al. |
| 2013/0055262 A1 | 2/2013 | Lubsey et al. |
| 2013/0061208 A1 | 3/2013 | Tsao et al. |
| 2013/0061212 A1 | 3/2013 | Krause et al. |
| 2013/0061220 A1 | 3/2013 | Gnanasambandam et al. |
| 2013/0067484 A1 | 3/2013 | Sonoda et al. |
| 2013/0067494 A1 | 3/2013 | Srour et al. |
| 2013/0080641 A1 | 3/2013 | Lui et al. |
| 2013/0091387 A1 | 4/2013 | Bohnet et al. |
| 2013/0097601 A1 | 4/2013 | Podvratnik et al. |
| 2013/0111032 A1 | 5/2013 | Alapati et al. |
| 2013/0111469 A1 | 5/2013 | B et al. |
| 2013/0124807 A1 | 5/2013 | Nielsen et al. |
| 2013/0132283 A1 | 5/2013 | Hayhow et al. |
| 2013/0132942 A1 | 5/2013 | Wang |
| 2013/0132953 A1 | 5/2013 | Chuang et al. |
| 2013/0139152 A1 | 5/2013 | Chang et al. |
| 2013/0139166 A1 | 5/2013 | Zhang et al. |
| 2013/0145354 A1 | 6/2013 | Bruening et al. |
| 2013/0151587 A1 | 6/2013 | Takeshima et al. |
| 2013/0151648 A1 | 6/2013 | Luna |
| 2013/0151684 A1 | 6/2013 | Forsman et al. |
| 2013/0152047 A1 | 6/2013 | Moorthi et al. |
| 2013/0167147 A1 | 6/2013 | Corrie et al. |
| 2013/0179574 A1 | 7/2013 | Calder et al. |
| 2013/0179881 A1 | 7/2013 | Calder et al. |
| 2013/0179894 A1 | 7/2013 | Calder et al. |
| 2013/0179895 A1 | 7/2013 | Calder et al. |
| 2013/0181998 A1 | 7/2013 | Malakapalli et al. |
| 2013/0185719 A1 | 7/2013 | Kar et al. |
| 2013/0185729 A1 | 7/2013 | Vasic et al. |
| 2013/0191847 A1 | 7/2013 | Sirota et al. |
| 2013/0191924 A1 | 7/2013 | Tedesco |
| 2013/0198319 A1 | 8/2013 | Shen et al. |
| 2013/0198743 A1 | 8/2013 | Kruglick |
| 2013/0198748 A1 | 8/2013 | Sharp et al. |
| 2013/0198763 A1 | 8/2013 | Kunze et al. |
| 2013/0205092 A1 | 8/2013 | Roy et al. |
| 2013/0205114 A1 | 8/2013 | Badam et al. |
| 2013/0219390 A1 | 8/2013 | Lee et al. |
| 2013/0227097 A1 | 8/2013 | Yasuda et al. |
| 2013/0227534 A1 | 8/2013 | Ike et al. |
| 2013/0227563 A1 | 8/2013 | McGrath |
| 2013/0227641 A1 | 8/2013 | White et al. |
| 2013/0227710 A1 | 8/2013 | Barak et al. |
| 2013/0232190 A1 | 9/2013 | Miller et al. |
| 2013/0232480 A1 | 9/2013 | Winterfeldt et al. |
| 2013/0239125 A1 | 9/2013 | Iorio |
| 2013/0246944 A1 | 9/2013 | Pandiyan et al. |
| 2013/0262556 A1 | 10/2013 | Xu et al. |
| 2013/0263117 A1 | 10/2013 | Konik et al. |
| 2013/0274006 A1 | 10/2013 | Hudlow et al. |
| 2013/0275376 A1 | 10/2013 | Hudlow et al. |
| 2013/0275958 A1 | 10/2013 | Ivanov et al. |
| 2013/0275969 A1 | 10/2013 | Dimitrov |
| 2013/0275975 A1 | 10/2013 | Masuda et al. |
| 2013/0283141 A1 | 10/2013 | Stevenson et al. |
| 2013/0283176 A1 | 10/2013 | Hoole et al. |
| 2013/0290538 A1 | 10/2013 | Gmach et al. |
| 2013/0291087 A1 | 10/2013 | Kailash et al. |
| 2013/0297964 A1 | 11/2013 | Hegdal et al. |
| 2013/0298183 A1 | 11/2013 | McGrath et al. |
| 2013/0311650 A1 | 11/2013 | Brandwine et al. |
| 2013/0326506 A1 | 12/2013 | McGrath et al. |
| 2013/0326507 A1 | 12/2013 | McGrath et al. |
| 2013/0332660 A1 | 12/2013 | Talagala et al. |
| 2013/0339950 A1 | 12/2013 | Ramarathinam et al. |
| 2013/0346470 A1 | 12/2013 | Obstfeld et al. |
| 2013/0346946 A1 | 12/2013 | Pinnix |
| 2013/0346952 A1 | 12/2013 | Huang et al. |
| 2013/0346964 A1 | 12/2013 | Nobuoka et al. |
| 2013/0346987 A1 | 12/2013 | Raney et al. |
| 2013/0346994 A1 | 12/2013 | Chen et al. |
| 2013/0347095 A1 | 12/2013 | Barjatiya et al. |
| 2014/0007097 A1 | 1/2014 | Chin et al. |
| 2014/0019523 A1 | 1/2014 | Heymann et al. |

(56) References Cited

U.S. PATENT DOCUMENTS

| | | |
|---|---|---|
| 2014/0019735 A1 | 1/2014 | Menon et al. |
| 2014/0019965 A1 | 1/2014 | Neuse et al. |
| 2014/0019966 A1 | 1/2014 | Neuse et al. |
| 2014/0040343 A1 | 2/2014 | Nickolov et al. |
| 2014/0040857 A1 | 2/2014 | Trinchini et al. |
| 2014/0040880 A1 | 2/2014 | Brownlow et al. |
| 2014/0047437 A1 | 2/2014 | Wu et al. |
| 2014/0058871 A1 | 2/2014 | Marr et al. |
| 2014/0059209 A1 | 2/2014 | Alnoor |
| 2014/0059226 A1 | 2/2014 | Messerli et al. |
| 2014/0059552 A1 | 2/2014 | Cunningham et al. |
| 2014/0068568 A1 | 3/2014 | Wisnovsky |
| 2014/0068608 A1 | 3/2014 | Kulkarni |
| 2014/0068611 A1 | 3/2014 | McGrath et al. |
| 2014/0073300 A1 | 3/2014 | Leeder et al. |
| 2014/0081984 A1 | 3/2014 | Sitsky et al. |
| 2014/0082165 A1 | 3/2014 | Marr et al. |
| 2014/0082201 A1 | 3/2014 | Shankari et al. |
| 2014/0101643 A1 | 4/2014 | Inoue |
| 2014/0101649 A1 | 4/2014 | Kamble et al. |
| 2014/0108722 A1 | 4/2014 | Lipchuk et al. |
| 2014/0109087 A1 | 4/2014 | Jujare et al. |
| 2014/0109088 A1 | 4/2014 | Dournov et al. |
| 2014/0129667 A1 | 5/2014 | Ozawa |
| 2014/0130040 A1 | 5/2014 | Lemanski |
| 2014/0137110 A1 | 5/2014 | Engle et al. |
| 2014/0164551 A1 | 6/2014 | Resch et al. |
| 2014/0173614 A1 | 6/2014 | Konik et al. |
| 2014/0173616 A1 | 6/2014 | Bird et al. |
| 2014/0180862 A1 | 6/2014 | Certain et al. |
| 2014/0189677 A1 | 7/2014 | Curzi et al. |
| 2014/0189704 A1 | 7/2014 | Narvaez et al. |
| 2014/0201735 A1 | 7/2014 | Kannan et al. |
| 2014/0207912 A1 | 7/2014 | Thibeault |
| 2014/0214752 A1 | 7/2014 | Rash et al. |
| 2014/0215073 A1 | 7/2014 | Dow et al. |
| 2014/0229221 A1 | 8/2014 | Shih et al. |
| 2014/0229942 A1 | 8/2014 | Wiseman et al. |
| 2014/0245297 A1 | 8/2014 | Hackett |
| 2014/0258777 A1 | 9/2014 | Cheriton |
| 2014/0279581 A1 | 9/2014 | Devereaux |
| 2014/0280325 A1 | 9/2014 | Krishnamurthy et al. |
| 2014/0282418 A1 | 9/2014 | Wood et al. |
| 2014/0282559 A1 | 9/2014 | Verduzco et al. |
| 2014/0282615 A1 | 9/2014 | Cavage et al. |
| 2014/0282629 A1 | 9/2014 | Gupta et al. |
| 2014/0283045 A1 | 9/2014 | Brandwine et al. |
| 2014/0289286 A1 | 9/2014 | Gusak |
| 2014/0298295 A1 | 10/2014 | Overbeck |
| 2014/0304246 A1 | 10/2014 | Helmich et al. |
| 2014/0304698 A1 | 10/2014 | Chigurapati et al. |
| 2014/0304815 A1 | 10/2014 | Maeda |
| 2014/0317617 A1 | 10/2014 | O'Donnell |
| 2014/0330936 A1 | 11/2014 | Factor et al. |
| 2014/0331222 A1 | 11/2014 | Zheng |
| 2014/0337953 A1 | 11/2014 | Banatwala et al. |
| 2014/0344457 A1 | 11/2014 | Bruno, Jr. et al. |
| 2014/0344736 A1 | 11/2014 | Ryman et al. |
| 2014/0351674 A1 | 11/2014 | Grube et al. |
| 2014/0359093 A1 | 12/2014 | Raju et al. |
| 2014/0359608 A1 | 12/2014 | Tsirkin et al. |
| 2014/0365781 A1 | 12/2014 | Dmitrienko et al. |
| 2014/0372489 A1 | 12/2014 | Jaiswal et al. |
| 2014/0372533 A1 | 12/2014 | Fu et al. |
| 2014/0380085 A1 | 12/2014 | Rash et al. |
| 2015/0006487 A1 | 1/2015 | Yang et al. |
| 2015/0025989 A1 | 1/2015 | Dunstan |
| 2015/0033241 A1 | 1/2015 | Jackson et al. |
| 2015/0039891 A1 | 2/2015 | Ignatchenko et al. |
| 2015/0040229 A1 | 2/2015 | Chan et al. |
| 2015/0046926 A1 | 2/2015 | Kenchammana-Hosekote et al. |
| 2015/0046971 A1 | 2/2015 | Huh et al. |
| 2015/0052258 A1 | 2/2015 | Johnson et al. |
| 2015/0058914 A1 | 2/2015 | Yadav |
| 2015/0067019 A1 | 3/2015 | Balko |
| 2015/0067830 A1 | 3/2015 | Johansson et al. |
| 2015/0074659 A1 | 3/2015 | Madsen et al. |
| 2015/0074661 A1 | 3/2015 | Kothari et al. |
| 2015/0074662 A1 | 3/2015 | Saladi et al. |
| 2015/0074675 A1 | 3/2015 | Qi et al. |
| 2015/0081885 A1 | 3/2015 | Thomas et al. |
| 2015/0095822 A1 | 4/2015 | Feis et al. |
| 2015/0106805 A1 | 4/2015 | Melander et al. |
| 2015/0120928 A1 | 4/2015 | Gummaraju et al. |
| 2015/0121391 A1 | 4/2015 | Wang |
| 2015/0134626 A1 | 5/2015 | Theimer et al. |
| 2015/0135287 A1 | 5/2015 | Medeiros et al. |
| 2015/0142747 A1 | 5/2015 | Zou |
| 2015/0142952 A1 | 5/2015 | Bragstad et al. |
| 2015/0143374 A1 | 5/2015 | Banga et al. |
| 2015/0143381 A1 | 5/2015 | Chin et al. |
| 2015/0146716 A1 | 5/2015 | Olivier et al. |
| 2015/0154046 A1 | 6/2015 | Farkas et al. |
| 2015/0161384 A1 | 6/2015 | Gu et al. |
| 2015/0163231 A1 | 6/2015 | Sobko et al. |
| 2015/0178019 A1 | 6/2015 | Hegdal et al. |
| 2015/0178110 A1 | 6/2015 | Li et al. |
| 2015/0186129 A1 | 7/2015 | Apte et al. |
| 2015/0188775 A1 | 7/2015 | Van Der Walt et al. |
| 2015/0199218 A1 | 7/2015 | Wilson et al. |
| 2015/0205596 A1 | 7/2015 | Hiltegen et al. |
| 2015/0206139 A1 | 7/2015 | Lea |
| 2015/0212818 A1 | 7/2015 | Gschwind et al. |
| 2015/0227598 A1 | 8/2015 | Hahn et al. |
| 2015/0229645 A1 | 8/2015 | Keith et al. |
| 2015/0235144 A1 | 8/2015 | Gusev et al. |
| 2015/0242225 A1 | 8/2015 | Muller et al. |
| 2015/0254248 A1 | 9/2015 | Burns et al. |
| 2015/0256514 A1 | 9/2015 | Laivand et al. |
| 2015/0256621 A1 | 9/2015 | Noda et al. |
| 2015/0261578 A1 | 9/2015 | Greden et al. |
| 2015/0264014 A1 | 9/2015 | Budhani et al. |
| 2015/0269494 A1 | 9/2015 | Kardes et al. |
| 2015/0271073 A1 | 9/2015 | Saladi et al. |
| 2015/0271280 A1 | 9/2015 | Zhang et al. |
| 2015/0289220 A1 | 10/2015 | Kim et al. |
| 2015/0309923 A1 | 10/2015 | Iwata et al. |
| 2015/0319160 A1 | 11/2015 | Ferguson et al. |
| 2015/0319174 A1 | 11/2015 | Hayton et al. |
| 2015/0324174 A1 | 11/2015 | Bromley et al. |
| 2015/0324182 A1 | 11/2015 | Barros et al. |
| 2015/0324210 A1 | 11/2015 | Carlson |
| 2015/0324229 A1 | 11/2015 | Valine |
| 2015/0332048 A1 | 11/2015 | Mooring et al. |
| 2015/0332195 A1 | 11/2015 | Jue |
| 2015/0334173 A1 | 11/2015 | Coulmeau et al. |
| 2015/0350701 A1 | 12/2015 | Lemus et al. |
| 2015/0356294 A1 | 12/2015 | Tan et al. |
| 2015/0363181 A1 | 12/2015 | Alberti et al. |
| 2015/0363304 A1 | 12/2015 | Nagamalla et al. |
| 2015/0370560 A1 | 12/2015 | Tan et al. |
| 2015/0370591 A1 | 12/2015 | Tuch et al. |
| 2015/0370592 A1 | 12/2015 | Tuch et al. |
| 2015/0371244 A1 | 12/2015 | Neuse et al. |
| 2015/0378762 A1 | 12/2015 | Saladi et al. |
| 2015/0378764 A1 | 12/2015 | Sivasubramanian et al. |
| 2015/0378765 A1 | 12/2015 | Singh et al. |
| 2015/0379167 A1 | 12/2015 | Griffith et al. |
| 2016/0011901 A1 | 1/2016 | Hurwitz et al. |
| 2016/0012099 A1 | 1/2016 | Tuatini et al. |
| 2016/0019081 A1 | 1/2016 | Chandrasekaran et al. |
| 2016/0019082 A1 | 1/2016 | Chandrasekaran et al. |
| 2016/0019536 A1 | 1/2016 | Ortiz et al. |
| 2016/0021112 A1 | 1/2016 | Katieb |
| 2016/0026486 A1 | 1/2016 | Abdallah |
| 2016/0048606 A1 | 2/2016 | Rubinstein et al. |
| 2016/0070714 A1 | 3/2016 | D'Sa et al. |
| 2016/0072727 A1 | 3/2016 | Leafe et al. |
| 2016/0072781 A1 | 3/2016 | Zhang et al. |
| 2016/0077901 A1 | 3/2016 | Roth et al. |
| 2016/0092320 A1 | 3/2016 | Baca |
| 2016/0092493 A1 | 3/2016 | Ko et al. |
| 2016/0098285 A1 | 4/2016 | Davis et al. |
| 2016/0100036 A1 | 4/2016 | Lo et al. |

(56) References Cited

U.S. PATENT DOCUMENTS

| | | |
|---|---|---|
| 2016/0103739 A1 | 4/2016 | Huang et al. |
| 2016/0110188 A1 | 4/2016 | Verde et al. |
| 2016/0117163 A1 | 4/2016 | Fukui et al. |
| 2016/0117254 A1 | 4/2016 | Susarla et al. |
| 2016/0119289 A1 | 4/2016 | Jain et al. |
| 2016/0124665 A1 | 5/2016 | Jain et al. |
| 2016/0124978 A1 | 5/2016 | Nithrakashyap et al. |
| 2016/0140180 A1 | 5/2016 | Park et al. |
| 2016/0150053 A1 | 5/2016 | Janczuk et al. |
| 2016/0188367 A1 | 6/2016 | Zeng |
| 2016/0191420 A1 | 6/2016 | Nagarajan et al. |
| 2016/0198235 A1 | 7/2016 | Liu et al. |
| 2016/0203219 A1 | 7/2016 | Hoch et al. |
| 2016/0212007 A1 | 7/2016 | Alatorre et al. |
| 2016/0226955 A1 | 8/2016 | Moorthi et al. |
| 2016/0282930 A1 | 9/2016 | Ramachandran et al. |
| 2016/0285906 A1 | 9/2016 | Fine et al. |
| 2016/0292016 A1 | 10/2016 | Bussard et al. |
| 2016/0294614 A1 | 10/2016 | Searle et al. |
| 2016/0306613 A1 | 10/2016 | Busi et al. |
| 2016/0315910 A1 | 10/2016 | Kaufman |
| 2016/0350099 A1 | 12/2016 | Suparna et al. |
| 2016/0350124 A1 | 12/2016 | Gschwind et al. |
| 2016/0357536 A1 | 12/2016 | Firlik et al. |
| 2016/0364265 A1 | 12/2016 | Cao et al. |
| 2016/0364316 A1 | 12/2016 | Bhat et al. |
| 2016/0371127 A1 | 12/2016 | Antony et al. |
| 2016/0371156 A1 | 12/2016 | Merriman |
| 2016/0378449 A1 | 12/2016 | Khazanchi et al. |
| 2016/0378525 A1 | 12/2016 | Bjorkengren |
| 2016/0378547 A1 | 12/2016 | Brouwer et al. |
| 2016/0378554 A1 | 12/2016 | Gummaraju et al. |
| 2017/0004169 A1 | 1/2017 | Merrill et al. |
| 2017/0032000 A1 | 2/2017 | Sharma et al. |
| 2017/0041144 A1 | 2/2017 | Krapf et al. |
| 2017/0041309 A1 | 2/2017 | Ekambaram et al. |
| 2017/0060615 A1 | 3/2017 | Thakkar et al. |
| 2017/0060621 A1 | 3/2017 | Whipple et al. |
| 2017/0068574 A1 | 3/2017 | Cherkasova et al. |
| 2017/0075749 A1 | 3/2017 | Ambichl et al. |
| 2017/0083381 A1 | 3/2017 | Cong et al. |
| 2017/0085447 A1 | 3/2017 | Chen et al. |
| 2017/0085502 A1 | 3/2017 | Biruduraju |
| 2017/0085591 A1 | 3/2017 | Ganda et al. |
| 2017/0091235 A1 | 3/2017 | Yammine et al. |
| 2017/0091296 A1 | 3/2017 | Beard et al. |
| 2017/0093684 A1 | 3/2017 | Jayaraman et al. |
| 2017/0093920 A1 | 3/2017 | Ducatel et al. |
| 2017/0134519 A1 | 5/2017 | Chen et al. |
| 2017/0142099 A1 | 5/2017 | Hinohara et al. |
| 2017/0147656 A1 | 5/2017 | Choudhary et al. |
| 2017/0149740 A1 | 5/2017 | Mansour et al. |
| 2017/0153965 A1 | 6/2017 | Nitta et al. |
| 2017/0161059 A1 | 6/2017 | Wood et al. |
| 2017/0177266 A1 | 6/2017 | Doerner et al. |
| 2017/0177441 A1 | 6/2017 | Chow |
| 2017/0177854 A1 | 6/2017 | Gligor et al. |
| 2017/0188213 A1 | 6/2017 | Nirantar et al. |
| 2017/0192825 A1 | 7/2017 | Biberman et al. |
| 2017/0221000 A1 | 8/2017 | Anand |
| 2017/0230262 A1 | 8/2017 | Sreeramoju et al. |
| 2017/0230499 A1 | 8/2017 | Mumick et al. |
| 2017/0249130 A1 | 8/2017 | Smiljamic et al. |
| 2017/0264681 A1 | 9/2017 | Apte et al. |
| 2017/0272462 A1 | 9/2017 | Kraemer et al. |
| 2017/0286187 A1 | 10/2017 | Chen et al. |
| 2017/0288878 A1 | 10/2017 | Lee et al. |
| 2017/0308520 A1 | 10/2017 | Beahan, Jr. et al. |
| 2017/0315163 A1 | 11/2017 | Wang et al. |
| 2017/0322824 A1 | 11/2017 | Reuther et al. |
| 2017/0329578 A1 | 11/2017 | Iscen |
| 2017/0346808 A1 | 11/2017 | Anzai et al. |
| 2017/0353851 A1 | 12/2017 | Gonzalez et al. |
| 2017/0364345 A1 | 12/2017 | Fontoura et al. |
| 2017/0371720 A1 | 12/2017 | Basu et al. |
| 2017/0372142 A1 | 12/2017 | Bilobrov |
| 2018/0004555 A1 | 1/2018 | Ramanathan et al. |
| 2018/0004556 A1 | 1/2018 | Marriner et al. |
| 2018/0032410 A1 | 2/2018 | Kang et al. |
| 2018/0046453 A1 | 2/2018 | Nair et al. |
| 2018/0046482 A1 | 2/2018 | Karve et al. |
| 2018/0060132 A1 | 3/2018 | Maru et al. |
| 2018/0060221 A1 | 3/2018 | Yim et al. |
| 2018/0060318 A1 | 3/2018 | Yang et al. |
| 2018/0067841 A1 | 3/2018 | Mahimkar |
| 2018/0067873 A1 | 3/2018 | Pikhur et al. |
| 2018/0069702 A1 | 3/2018 | Ayyadevara et al. |
| 2018/0081717 A1 | 3/2018 | Li |
| 2018/0089232 A1 | 3/2018 | Spektor et al. |
| 2018/0095738 A1 | 4/2018 | Dürkop et al. |
| 2018/0113770 A1 | 4/2018 | Hasanov et al. |
| 2018/0113793 A1 | 4/2018 | Fink et al. |
| 2018/0121665 A1 | 5/2018 | Anderson et al. |
| 2018/0129684 A1 | 5/2018 | Wilson et al. |
| 2018/0144263 A1 | 5/2018 | Saxena et al. |
| 2018/0150339 A1 | 5/2018 | Pan et al. |
| 2018/0152401 A1 | 5/2018 | Tandon et al. |
| 2018/0152405 A1 | 5/2018 | Kuo et al. |
| 2018/0152406 A1 | 5/2018 | Kuo et al. |
| 2018/0165110 A1 | 6/2018 | Htay |
| 2018/0192101 A1 | 7/2018 | Bilobrov |
| 2018/0225096 A1 | 8/2018 | Mishra et al. |
| 2018/0227300 A1 | 8/2018 | Nakic et al. |
| 2018/0239636 A1 | 8/2018 | Arora et al. |
| 2018/0253333 A1 | 9/2018 | Gupta |
| 2018/0255137 A1* | 9/2018 | Hu ............... H04L 63/102 |
| 2018/0268130 A1 | 9/2018 | Ghosh et al. |
| 2018/0275987 A1 | 9/2018 | Vandeputte |
| 2018/0285101 A1 | 10/2018 | Yahav et al. |
| 2018/0300111 A1 | 10/2018 | Bhat et al. |
| 2018/0314845 A1 | 11/2018 | Anderson et al. |
| 2018/0316552 A1 | 11/2018 | Subramani Nadar et al. |
| 2018/0341504 A1 | 11/2018 | Kissell |
| 2018/0365422 A1 | 12/2018 | Callaghan et al. |
| 2018/0367517 A1 | 12/2018 | Tus |
| 2018/0375781 A1 | 12/2018 | Chen et al. |
| 2019/0004866 A1 | 1/2019 | Du et al. |
| 2019/0018715 A1 | 1/2019 | Behrendt et al. |
| 2019/0028552 A1 | 1/2019 | Johnson, II et al. |
| 2019/0034095 A1 | 1/2019 | Singh et al. |
| 2019/0043231 A1 | 2/2019 | Uzgin et al. |
| 2019/0068622 A1* | 2/2019 | Lin ............... H04L 63/1441 |
| 2019/0072529 A1 | 3/2019 | Andrawes et al. |
| 2019/0073430 A1 | 3/2019 | Webster |
| 2019/0079751 A1 | 3/2019 | Foskett et al. |
| 2019/0102278 A1 | 4/2019 | Gahlin et al. |
| 2019/0140831 A1 | 5/2019 | De Lima Junior et al. |
| 2019/0141015 A1 | 5/2019 | Nellen |
| 2019/0147085 A1 | 5/2019 | Pal et al. |
| 2019/0147515 A1 | 5/2019 | Hurley et al. |
| 2019/0171423 A1 | 6/2019 | Mishra et al. |
| 2019/0179678 A1 | 6/2019 | Banerjee et al. |
| 2019/0179725 A1 | 6/2019 | Mital et al. |
| 2019/0180036 A1 | 6/2019 | Shukla |
| 2019/0188288 A1 | 6/2019 | Holm et al. |
| 2019/0235848 A1 | 8/2019 | Swiecki et al. |
| 2019/0238590 A1 | 8/2019 | Talukdar et al. |
| 2019/0250937 A1 | 8/2019 | Thomas et al. |
| 2019/0268152 A1 | 8/2019 | Sandoval et al. |
| 2019/0278938 A1 | 9/2019 | Greene et al. |
| 2019/0286475 A1 | 9/2019 | Mani |
| 2019/0286492 A1 | 9/2019 | Gulsvig Wood et al. |
| 2019/0303117 A1 | 10/2019 | Kocberber et al. |
| 2019/0306692 A1* | 10/2019 | Garty ............... H04L 67/51 |
| 2019/0311115 A1 | 10/2019 | Lavi et al. |
| 2019/0318312 A1 | 10/2019 | Foskett et al. |
| 2019/0320038 A1 | 10/2019 | Walsh et al. |
| 2019/0324813 A1 | 10/2019 | Bogineni et al. |
| 2019/0339955 A1 | 11/2019 | Kuo et al. |
| 2019/0361802 A1 | 11/2019 | Li et al. |
| 2019/0363885 A1 | 11/2019 | Schiavoni et al. |
| 2019/0370113 A1 | 12/2019 | Zhang et al. |
| 2020/0007456 A1 | 1/2020 | Greenstein et al. |
| 2020/0026527 A1 | 1/2020 | Xu et al. |

(56) References Cited

U.S. PATENT DOCUMENTS

| | | | |
|---|---|---|---|
| 2020/0028936 A1 | 1/2020 | Gupta et al. | |
| 2020/0034471 A1 | 1/2020 | Danilov et al. | |
| 2020/0065079 A1 | 2/2020 | Kocberber et al. | |
| 2020/0073770 A1 | 3/2020 | Mortimore, Jr. et al. | |
| 2020/0073987 A1 | 3/2020 | Perumala et al. | |
| 2020/0081745 A1 | 3/2020 | Cybulski et al. | |
| 2020/0110691 A1 | 4/2020 | Bryant et al. | |
| 2020/0120120 A1 | 4/2020 | Cybulski | |
| 2020/0134030 A1 | 4/2020 | Natanzon et al. | |
| 2020/0136933 A1 | 4/2020 | Raskar | |
| 2020/0153798 A1 | 5/2020 | Liebherr | |
| 2020/0153897 A1 | 5/2020 | Mestery et al. | |
| 2020/0167208 A1 | 5/2020 | Floes et al. | |
| 2020/0186445 A1* | 6/2020 | Govindaraju | H04L 67/34 |
| 2020/0192646 A1 | 6/2020 | Yerramreddy et al. | |
| 2020/0213151 A1 | 7/2020 | Srivatsan et al. | |
| 2020/0241930 A1 | 7/2020 | Garg et al. | |
| 2020/0327236 A1 | 10/2020 | Pratt et al. | |
| 2020/0348979 A1 | 11/2020 | Calmon | |
| 2020/0349067 A1 | 11/2020 | Syamala et al. | |
| 2020/0366587 A1 | 11/2020 | White et al. | |
| 2020/0401455 A1 | 12/2020 | Church et al. | |
| 2020/0412538 A1* | 12/2020 | Rosado | H04L 63/126 |
| 2021/0019056 A1 | 1/2021 | Mangione-Tran | |
| 2021/0042160 A1* | 2/2021 | Alamouti | G06N 5/022 |
| 2021/0081233 A1 | 3/2021 | Mullen et al. | |
| 2021/0117217 A1* | 4/2021 | Croteau | G06F 11/302 |
| 2021/0117534 A1 | 4/2021 | Maximov et al. | |
| 2021/0124822 A1 | 4/2021 | Tiwary et al. | |
| 2021/0176333 A1 | 6/2021 | Coleman et al. | |
| 2021/0233045 A1* | 7/2021 | Singh | G06Q 20/12 |
| 2021/0294646 A1 | 9/2021 | Hassaan et al. | |
| 2021/0303720 A1* | 9/2021 | Creenaune | H04L 63/10 |
| 2021/0314250 A1* | 10/2021 | Laplante | H04L 63/105 |
| 2021/0342145 A1* | 11/2021 | Miller | G06F 8/60 |
| 2021/0342329 A1* | 11/2021 | Padmanabhan | H04L 63/12 |
| 2022/0012083 A1 | 1/2022 | Brooker et al. | |
| 2022/0200993 A1* | 6/2022 | Smith | H04L 63/20 |
| 2022/0201041 A1* | 6/2022 | Keiser, Jr. | H04L 41/0893 |
| 2022/0214863 A1 | 7/2022 | Clement et al. | |
| 2022/0391238 A1 | 12/2022 | Wagner | |
| 2023/0024699 A1 | 1/2023 | Bayoumi et al. | |

FOREIGN PATENT DOCUMENTS

| | | |
|---|---|---|
| CN | 101002170 A | 7/2007 |
| CN | 101267334 A | 9/2008 |
| CN | 101345757 A | 1/2009 |
| CN | 101496005 A | 7/2009 |
| CN | 101627388 A | 1/2010 |
| CN | 101640700 A | 2/2010 |
| CN | 101764824 A | 6/2010 |
| CN | 102171712 A | 8/2011 |
| CN | 102246152 A | 11/2011 |
| CN | 102365858 A | 2/2012 |
| CN | 102420846 A | 4/2012 |
| CN | 102761549 A | 10/2012 |
| CN | 103098027 A | 5/2013 |
| CN | 103140828 A | 6/2013 |
| CN | 103384237 A | 11/2013 |
| CN | 103731427 A | 4/2014 |
| CN | 104111848 A | 10/2014 |
| CN | 104160378 A | 11/2014 |
| CN | 104243479 A | 12/2014 |
| CN | 104903854 A | 9/2015 |
| CN | 105122243 A | 12/2015 |
| CN | 105956000 A | 9/2016 |
| CN | 106921651 A | 7/2017 |
| CN | 107534672 A | 1/2018 |
| EP | 2663052 A1 | 11/2013 |
| JP | 2002-287974 A | 10/2002 |
| JP | 2006-107599 A | 4/2006 |
| JP | 2007-080161 A | 3/2007 |
| JP | 2007-538323 A | 12/2007 |
| JP | 2010-026562 A | 2/2010 |
| JP | 2011-065243 A | 3/2011 |
| JP | 2011-233146 A | 11/2011 |
| JP | 2011-257847 A | 12/2011 |
| JP | 2012-078893 A | 4/2012 |
| JP | 2012-104150 A | 5/2012 |
| JP | 2013-156996 A | 8/2013 |
| JP | 2014-525624 A | 9/2014 |
| JP | 2016-507100 A | 3/2016 |
| JP | 2017-534107 A | 11/2017 |
| JP | 2017-534967 A | 11/2017 |
| JP | 2018-503896 A | 2/2018 |
| JP | 2018-512087 A | 5/2018 |
| JP | 2018-536213 A | 12/2018 |
| KR | 10-357850 B1 | 10/2002 |
| WO | WO 2008/114454 A1 | 9/2008 |
| WO | WO 2009/137567 A1 | 11/2009 |
| WO | WO 2012/039834 A1 | 3/2012 |
| WO | WO 2012/050772 A1 | 4/2012 |
| WO | WO 2013/106257 A1 | 7/2013 |
| WO | WO 2015/078394 A1 | 6/2015 |
| WO | WO 2015/108539 A1 | 7/2015 |
| WO | WO 2015/149017 A1 | 10/2015 |
| WO | WO 2016/053950 A1 | 4/2016 |
| WO | WO 2016/053968 A1 | 4/2016 |
| WO | WO 2016/053973 A1 | 4/2016 |
| WO | WO 2016/090292 A1 | 6/2016 |
| WO | WO 2016/126731 A1 | 8/2016 |
| WO | WO 2016/164633 A1 | 10/2016 |
| WO | WO 2016/164638 A1 | 10/2016 |
| WO | WO 2017/059248 A1 | 4/2017 |
| WO | WO 2017/112526 A1 | 6/2017 |
| WO | WO 2017/172440 A1 | 10/2017 |
| WO | WO 2018/005829 A1 | 1/2018 |
| WO | WO 2018/039514 A1 | 1/2018 |
| WO | WO 2018/098443 A1 | 5/2018 |
| WO | WO 2018/098445 A1 | 5/2018 |
| WO | WO 2020/005764 A1 | 1/2020 |
| WO | WO 2020/006081 A1 | 1/2020 |
| WO | WO 2020/069104 A1 | 4/2020 |
| WO | WO 2020/123439 A1 | 6/2020 |
| WO | WO 2020/264431 A1 | 12/2020 |
| WO | WO 2021/108435 A1 | 6/2021 |
| WO | WO 2023/107649 A1 | 6/2023 |

OTHER PUBLICATIONS

Cordingly, Robert et al. Predicting Performance and Cost of Serverless Computing Functions with SAAF. 2020 IEEE Intl Conf on DASC/PiCom/CBDCom/CyberSciTech. https://ieeexplore.IEEE.org/stamp/stamp.jsp?tp=&arnumber=9251165 (Year: 2020).*

Chauvel, Franck; Solberg, Arnor. Using Intrusive Microservices to Enable Deep Customization of Multi-tenant SaaS. 2018 11th International Conference on the Quality of Information and Communications Technology (QUATIC).https://ieeexplore.IEEE.org/stamp/stamp.jsp?tp=&arnumber=8590168 (Year: 2018).*

Xiong, Jinjun; Chen, Huamin. Challenges for Building a Cloud Native Scalable and Trustable Multi-tenant AIoT Platform. 2020 IEEE/ACM International Conference On Computer Aided Design (ICCAD). https://ieeexplore.IEEE.org/stamp/stamp.jsp?tp=&arnumber= 9256419 (Year: 2020).*

Anonymous: "Amazon Elastic Compute Cloud User Guide for Linux Instances—first 400 pages of 795," Apr. 8, 2016 (Apr. 8, 2016_, XP055946665, Retrieved from the Internet: URL:https://web.archive.org/web/20160408211543if_/http://docs.aws.amazon.com/AWSEC2/latest/UserGuide/ec2-ug.pdf (retrieved on Jul. 27, 2022] 795 pages.

Anonymous: "Amazon Cognito Developer Guide," Jun. 24, 2001, XP093030075, retrieved from the internet: URL:https://web.archive.org/web/20210624153941if_/https://docs.aws.amazon.com/cognito/latest/developerguide/cognito-dg. pdf [retrieved on Mar. 9, 2023] the whole document.

Anonymous: "Amazon Simple Workflow Service Developer Guide API Version 2012-01-25," Jun. 11, 2016 (Jun. 11, 2016), XP055946928, Retrieved from the Internet: URL:https://web.archive.org/web/20160111075522if_/http://docs.aws.amazon.com/amazonswf/latest/developerguide/swf-dg.pdf [retrieved on Jul. 28, 2022] in 197 pages.

(56) References Cited

OTHER PUBLICATIONS

Anonymous: "alias (command)—Wikipedia," Jun. 28, 2016, pp. 106, XP093089956, Retrieved fromthe Internet: URL:https://en.wikipedia.org/w/index.php?title=Alias_(command)&oldid=727315645 [retrieved on Oct. 9, 2023.

Anonymous: "AWS Flow Framework for Java," Apr. 7, 2016 (Apr. 7, 2016), XP055946535, Retrieved from the Internet: URL:https://web.archive.org/web/20160407214715if_/http://docs.aws.amazon.com/amazonswf/latest/awsflowguide/swf-aflow.pdf, [retrieved Apr. 27, 2022] in 139 pages.

Anonymous: "AWS Lambda Developer Guide," Jul. 1, 2021, XP093024770, retrieved from the internet: URL:https://web.archieve.org/web/20210701100128if_/https://docs.aws.amazon.com/lambda/latest/dg/lambda-dg.pdf [retrieved on Feb. 17, 2023] the whole document.

Anonymous: "AWS Lambda Developer Guide," Jul. 1, 2021, XP093024770, retrieved from the internet: URL:https://web.archive.org/web/20210701100128if_/https://docs.aws.amazon.com/lambda/latest/dg/lambda-dg.pdf [retrieved on Feb. 17, 2023] the whole document.

Anonymous: "Docker run reference", Dec. 7, 2015, XP055350246, Retrieved from the Internet:URL:https://web.archive.org/web/20151207111702/https:/docs.docker.com/engine/reference/run/ [retrieved on Feb. 28, 2017].

Anonymous: SaaS Tenant Isolution Strategies Isolating Resources in a Multi-Tenant Environment,: Aug. 1, 2020, XP093030095, retrieved from the internet: URL:https://dl.awsstatic.com/whitepapers/saas-tenant-isolation-strategies.pdf [retrieved on Mar. 9, 2023] the whole document.

Anonymous: "Security Overview of AWS Lambda," Aug. 11, 2021, XP093030100, retrieved from the internet:URL:https://web.archive.org/web/20210811044132if_/https://docs.aws.amazon.com/whitepapers/latest/security-overview-aws-lambda/security-overview-aws-lambda.pdf [retrieved Mar. 9, 2023] the whole document.

Abebe et al., "EC-Store: Bridging the Gap Between Storage and Latency in Distribute Erasure CodedSystems", IEEE 38th International Conference on Distributed Computing Systems, 2018, pp. 255-266.

Adapter Pattern, Wikipedia,https://en.wikipedia.org/w/index.php?title=Adapter_pattern&oldid=654971255, [retrieved May 26, 2016], 6 pages.

Amazon, "AWS Lambda: Developer Guide", Jun. 26, 2016 Retrieved from the Internet,URL:http://docs.aws.amazon.com/lambda/latest/dg/lambda-dg.pdf, [retrieved on Aug. 30, 2017], 314 pages.

Amazon, "AWS Lambda: Developer Guide", Apr. 30, 2016 Retrieved from the Internet, URL:https://web.archive.org/web/20160430050158/http://docs.aws.amazon.com:80/lambda/latest/dg/lambda-dg.pdf, 346 pages.

Amazon, "AWS Lambda: Developer Guide", Retrieved from the Internet, 2019, URL : http://docs.aws.amazon.com/lambda/ latest/dg/lambda-dg.pdf, 521 pages.

Balazinska et al., Moirae: History-Enhanced Monitoring, Published: Jan. 2007, 12 pages.

Bebenita et al., "Trace-Based Compilation in Execution Environments without Interpreters," ACM, Copyright 2010, 10 pages.

Ben-Yehuda et al., "Deconstructing Amazon EC2 Spot Instance Pricing", ACM Transactions on Economics and Computation 1.3, Sep. 2013, 15 pages.

Bhadani et al., Performance evaluation of web servers using central load balancing policy over virtual machines on cloud, Jan. 2010, 4 pages.

Bryan Liston, "Ad Hoc Big Data Processing Made Simple with Serverless Map Reduce", Nov. 4, 2016, Amazon Web Services <https ://laws. amazon .com/bl ogs/compute/ad-hoc-big-data-processi ng-made-si mple-with-serverless-mapred uce >.

CodeChef Admin discussion web page, retrieved from https://discuss.codechef.com/t/what-are-the-memory-limit-and-stack-size-on-codechef/14159, retrieved on Sep. 10, 2019.

CodeChef IDE web page, Code, Compile & Run, retrieved from https://www.codechef.com/ide, retrieved on Sep. 9, 2019.

Czajkowski, G., and L. Daynes, Multitasking Without Compromise: A Virtual Machine Evolution 47(4a):60-73, ACM SIGPLAN Notices—Supplemental Issue, Apr. 2012.

Das et al., Adaptive Stream Processing using Dynamic Batch Sizing, Nov. 2014, 13 pages.

Deis, Container, Jun. 2014, 1 page.

Dean et al., "MapReduce: Simplified Data Processing on Large Clusters", ACM, 2008, pp. 107-113.

Dombrowski, M., et al., Dynamic Monitor Allocation in the Java Virtual Machine, JTRES '13, Oct. 9- 11, 2013, pp. 30-37.

Dornemann et al., "On-Demand Resource Provisioning for BPEL Workflows Using Amazon's ElasticCompute Cloud", 9th IEEE/ACM International Symposium on Cluster Computing and the Grid, 2009, pp. 140-147.

Dynamic HTML, Wikipedia page from date Mar. 27, 2015, retrieved using the WayBackMachine, fromhttps://web.archive.org/web/20150327215418/https://en.wikipedia.org/wiki/Dynamic_HTML, 2015, 6 pages.

Ekanayake et al, "Twister: A Runtime for Iterative MapReduce", ACM, 2010, pp. 810-818.

Espadas, J., et al., A Tenant-Based Resource Allocation Model for Scaling Software-as-a-Service Applications Over Cloud Computing Infrastructures, Future Generation Computer Systems, vol. 29, pp. 273-286, 2013.

Fan et al., Online Optimization of VM Deployment in IaaS Cloud, Dec. 17, 2012-Dec. 19, 2012, 6 pages.

Ha et al., A Concurrent Trace-based Just-In-Time Compiler for Single-threaded JavaScript, utexas.edu, Jun. 2009.

Hammoud et al., "Locality-Aware Reduce Task Scheduling for MapReduce", IEEE, 2011, pp. 570-576.

Han et al., Lightweight Resource Scaling for Cloud Applications, May 13, 2012-May 16, 2012, 8 pages.

Hoffman, Auto scaling your website with Amazon Web Services (AWS)—Part 2, Cardinalpath, Sept, 2015, 15 pages.

http://discuss.codechef.com discussion web page from date Nov. 11, 2012, retrieved using the WayBackMachine, from https://web.archive.org/web/20121111040051 /http://discuss.codechef.com/questions/2881 /why-are-simple-java-programs-using-up-so-much-space, 2012.

https://www.codechef.com code error help page from Jan. 2014, retrieved from https://www.codechef.com/JAN14/status/ERROR, va123, 2014.

http://www.codechef.com/ide web page from date Apr. 5, 2015, retrieved using the WayBackMachine, from https://web.archive.org/web/20150405045518/http://www.codechef.com/ide, 2015.

Huang, Zhe, Danny HK Tsang, and James She. "A virtual machine consolidation framework formapreduce enabled computing clouds." 2012 24th International Teletraffic Congress (ITC 24). IEEE, Sep. 4, 2012-Sep. 7, 2012.

Huang et al., "Erasure Coding in Windows Azure Storege", USENIX, 2012 in 12 pages.

Kamga et al., Extended scheduler for efficient frequency scaling in virtualized systems, Jul. 2012, 8 pages.

IBM, what is Serverless computing, https://www.IBM.com/topics/serverless#:-:test=Serverless%20is%20a%20cloud%20computing, managing%20servers%20or%20backend%20infr astructure, pp. 1-11 (Year: 2023).

Kato, et al. "Web Service Conversion Architecture of the Web Application and Evaluation"; Research Report from Information Processing Society, Apr. 3, 2006 with Machine Translation.

Kazempour et al., AASH: an asymmetry-aware scheduler for hypervisors, Jul. 2010, 12 pages.

Kim et al., "MRBench: A Benchmark for Map-Reduce Framework", IEEE, 2008, pp. 11-18.

Kraft et al., 10 performance prediction in consolidated virtualized environments, Mar. 2011, 12 pages.

Krsul et al., "VMPlants: Providing and Managing Virtual Machine Execution Environments for GridComputing", SuperComputing 2004. Proceedings of the ACM/IEEE 2004 Conference Pittsburgh, PA, XP010780332, Nov. 6-12, 2004, 12 pages.

(56) References Cited

OTHER PUBLICATIONS

Lagar-Cavilla et al., "SnowFlock: Virtual Machine Cloning as a First-Class Cloud Primitive", ACM Transactions on Computer Systems, vol. 29, No. 1, Article 2, Publication date: Feb. 2011, in 45 pages.
Lin, "MR-Apriori: Association Rules Algorithm Based on MapReduce", IEEE, 2014, pp. 141-144.
Meng et al., Efficient resource provisioning in compute clouds via VM multiplexing, Jun. 2010, 10 pages.
Merkel, "Docker: Lightweight Linux Containers for Consistent Development and Deployment", Linux Journal, vol. 2014 Issue 239, Mar. 2014, XP055171140, 16 pages.
Monteil, Coupling profile and historical methods to predict execution time of parallel applications. Parallel and Cloud Computing, Jul. 2013, <hal-01228236, pp. 81-89.
Nakajima, J., et al., Optimizing Virtual Machines Using Hybrid Virtualization, SAC '11, Mar. 21-25, 2011, TaiChung, Taiwan, pp. 573-578.
Neenan, Sarah Compare Serverless tools and services in the Public cloud, https://www.techtarget.com/searchcloudcomputing/feature/Compare-serverless-tools-and-services-in-the-public-cloud, TechTarget, pp. 1-4 (Year: 2023).
Qian, H., and D. Medhi, et al., Estimating Optimal Cost of Allocating Virtualized Resources With Dynamic Demand, ITC 2011, Sep. 2011, pp. 320-321.
Rashmi et al., "EC-Cache: Load-Balance, Low-Latency Cluster Caching with Online Erasure Coding", USENIX, 2016, pp. 401-417.
Ryden et al., "Nebula: Distributed Edge Cloud for Data-Intensive Computing", IEEE, 2014, pp. 491-492.
Sakamoto, et al. "Platform for Web Services using Proxy Server"; Research Report from Information Processing Society, Mar. 22, 2002, vol. 2002, No. 31.
Search Query Report from IP.com, performed Dec. 2, 2020.
Search Query Report from IP.com, performed May 27, 2021.
Sharma A. et al., "Building a Multi-Tenant SaaS Solution Using AWS Serverless Services," Aug. 26, 2021, XP093030094, retrieved from the internet: URL:https://aws.amazon.com/blogs/apn/building-a-multi-tenant-saas-solution-using-aws-serverless-services/ [retrieved on Mar. 9, 2023] the whole document.
Shim (computing), Wikipedia, https://en.wikipedia.org/w/index.php?title+Shim_(computing)&oldid+654971528, [retrieved on May 26, 2016], 2 pages.
Stack Overflow, Creating a database connection pool, Nov. 10, 2009, 4 pages.
Tan et al., Provisioning for large scale cloud computing services, Jun. 2012, 2 pages.
Tange, "GNU Parallel: The Command-Line Power Tool", vol. 36, No. 1, Jan. 1, 1942, pp. 42-47.
Vaghani, S.B., Virtual Machine File System, ACM SIGOPS Operating Systems Review 44(4):57-70, Dec. 2010.
Vaquero, L., et al., Dynamically Scaling Applications in the cloud, ACM SIGCOMM Computer Communication Review 41(1): 45-52, Jan. 2011.
Wang et al., "Improving utilization through dynamic VM resource allocation in hybrid cloudenvironment", Parallel and Distributed V Systems (ICPADS), IEEE, Dec. 16, 2014-Dec. 19, 2014. Retrieved on Feb. 14, 2019, Retrieved from the internet: URL<https://ieeexplore.ieee.org/stamp/stamp.jsp?tp=&arnumber=7097814, 8 pages.
Wikipedia "API" pages from date Apr. 7, 2015, retrieved using the WayBackMachine from https://web.archive.org/web/20150407191158/https://en.wikipedia.org/wiki/Application_programming_interface.
Wikipedia List_of_HTTP status_codes web page, retrieved from https://en.wikipedia.org/wiki/List_of_HTTP status_codes, retrieved on Sep. 10, 2019.
Wikipedia Recursion web page from date Mar. 26, 2015, retrieved using the WayBackMachine, from https://web.archive.org/web/20150326230100/https://en.wikipedia.org/wiki/Recursion_(computer_science), 2015.
Wikipedia: Serverless computing, https://en.wikipedia.org/wiki/Serverless_computing, pp. 107 (Year: 2023).
Wikipedia subroutine web page, retrieved from https://en.wikipedia.org/wiki/Subroutine, retrieved on Sep. 10, 2019.
Wood, Timothy, et al. "Cloud Net: dynamic pooling of cloud resources by live WAN migration of virtual machines." ACM Sigplan Notices 46.7 (2011): 121-132. (Year: 2011).
Wu et al., HC-Midware: A Middleware to Enable High Performance Communication System Simulationin Heterogeneous Cloud, Association for Computing Machinery, Oct. 20-22, 2017, 10 pages.
Yamasaki et al. "Model-based resource selection for efficient virtual cluster deployment", Virtualization Technology in Distributed Computing, ACM, Nov. 2007, pp. 1-7.
Yang, The Application of MapReduce in the Cloud Computing:, IEEE, 2011, pp. 154-156.
Yue et al., AC 2012-4107: Using Amazon EC2 in Computer and Network Security Lab Exercises: Design, Results, and Analysis, 2012, American Society for Engineering Education, Jun. 10, 2012.
Zhang et al., VMThunder: Fast Provisioning of Large-Scale Virtual Machine Clusters, IEEE Transactions on Parallel and Distributed Systems, vol. 25, No. 12, Dec. 2014, pp. 3328-3338.
Zheng, C., and D. Thain, Integrating Containers into Workflows: A Case Study Using Makeflow, Work Queue, and Docker, VTDC '15, Jun. 15, 2015, Portland, Oregon, pp. 31-38.
International Search Report and Written Opinion in PCT/US2015/052810 dated Dec. 17, 2015.
International Preliminary Report on Patentability in PCT/US2015/052810 dated Apr. 4, 2017.
Extended Search Report in European Application No. 15846932.0 dated May 3, 2018.
International Search Report and Written Opinion in PCT/US2015/052838 dated Dec. 18, 2015.
International Preliminary Report on Patentability in PCT/US2015/052838 dated Apr. 4, 2017.
Extended Search Report in European Application No. 15847202.7 dated Sep. 9, 2018.
Extended Search Report in European Application No. 19199402.9 dated Mar. 6, 2020.
International Search Report and Written Opinion in PCT/US2015/052833 dated Jan. 13, 2016.
International Preliminary Report on Patentability in PCT/US2015/052833 dated Apr. 4, 2017.
Extended Search Report in European Application No. 15846542.7 dated Aug. 27, 2018.
International Search Report and Written Opinion in PCT/US2015/064071dated Mar. 16, 2016.
International Preliminary Report on Patentability in PCT/US2015/064071 dated Jun. 6, 2017.
International Search Report and Written Opinion in PCT/US2016/016211 dated Apr. 13, 2016.
International Preliminary Report on Patentability in PCT/US2016/016211 dated Aug. 17, 2017.
European Examination Report, re EP Application No. 17743108.7, dated Oct. 12, 2022.
International Search Report and Written Opinion in PCT/US2016/026514 dated Jun. 8, 2016.
International Preliminary Report on Patentability in PCT/US2016/026514 dated Oct. 10, 2017.
International Search Report and Written Opinion in PCT/US2016/026520 dated Jul. 5, 2016.
International Preliminary Report on Patentability in PCT/US2016/026520 dated Oct. 10, 2017.
International Search Report for Application No. PCT/US2020/039996 dated Oct. 8, 2020.
International Preliminary Report on Patentability for Application No. PCT/US2020/039996 dated Jan. 6, 2022.
International Preliminary Report on Patentability for Application No. PCT/US2020/062060 dated Jun. 9, 2022 in 9 pages.
International Search Report and Written Opinion, re PCT Application No. PCT/US2022/052315, mailed Mar. 20, 2023.
International Search Report and Written Opinion in PCT/US2016/054774 dated Dec. 16, 2016.

(56) References Cited

OTHER PUBLICATIONS

International Preliminary Report on Patentability in PCT/US2016/054774 dated Apr. 3, 2018.
International Search Report and Written Opinion in PCT/US2016/066997 dated Mar. 20, 2017.
International Preliminary Report on Patentability in PCT/US2016/066997 dated Jun. 26, 2018.
International Search Report and Written Opinion in PCT/US/2017/023564 dated Jun. 6, 2017.
International Preliminary Report on Patentability in PCT/US/2017/023564 dated Oct. 2, 2018.
International Search Report and Written Opinion in PCT/US2017/040054 dated Sep. 21, 2017.
International Preliminary Report on Patentability in PCT/US2017/040054 dated Jan. 1, 2019.
International Search Report and Written Opinion in PCT/US2017/039514 dated Oct. 10, 2017.
International Preliminary Report on Patentability in PCT/US2017/039514 dated Jan. 1, 2019.
Extended European Search Report in application No. 17776325.7 dated Oct. 23, 2019.
International Search Report and Written Opinion mailed Oct. 15, 2019 for International Application No. PCT/US2019/039246 in 16 pages.
International Preliminary Report on Patentability mailed Dec. 29, 2020 for International Application No. PCT/US2019/039246 in 8 pages.
International Search Report for Application No. PCT/US2019/038520 dated Aug. 14, 2019.
International Preliminary Report on Patentability for Application No. PCT/US2019/038520 dated Dec. 29, 2020.
International Preliminary Report on Patentability and Written Opinion in PCT/US2019/053123 dated Mar. 23, 2021.
International Search Report and Written Opinion in PCT/US2019/053123 dated Jan. 7, 2020.
International Search Report for Application No. PCT/US2019/065365 dated Mar. 19, 2020.
International Preliminary Report on Patentability for Application No. PCT/US2019/065365 dated Jun. 8, 2021.

* cited by examiner

MULTI-TENANT MODE FOR SERVERLESS CODE EXECUTION

BACKGROUND

Computing devices can utilize communication networks to exchange data. Companies and organizations operate computer networks that interconnect a number of computing devices to support operations or to provide services to third parties. The computing systems can be located in a single geographic location or located in multiple, distinct geographic locations (e.g., interconnected via private or public communication networks). Specifically, data centers or data processing centers, herein generally referred to as a "data center," may include a number of interconnected computing systems to provide computing resources to users of the data center. The data centers may be private data centers operated on behalf of an organization or public data centers operated on behalf, or for the benefit of, the general public.

To facilitate increased utilization of data center resources, virtualization technologies allow a single physical computing device to host one or more virtual machine instances that appear and operate as independent computing devices to users of a data center. With virtualization, the single physical computing device can create, maintain, delete, or otherwise manage virtual machines in a dynamic manner. In turn, users can request computer resources from a data center, including single computing devices or a configuration of networked computing devices, and be provided with varying numbers of virtual machine resources.

In some scenarios, virtual machine instances may be configured according to a number of virtual machine instance types to provide specific functionality. For example, various computing devices may be associated with different combinations of operating systems or operating system configurations, virtualized hardware resources and software applications to enable a computing device to provide different desired functionalities, or to provide similar functionalities more efficiently. These virtual machine instance type configurations are often contained within a device image, which includes static data containing the software (e.g., the OS and applications together with their configuration and data files, etc.) that the virtual machine will run once started. The device image is typically stored on the disk used to create or initialize the instance. Thus, a computing device may process the device image in order to implement the desired software configuration.

DETAILED DESCRIPTION

Figure 1:
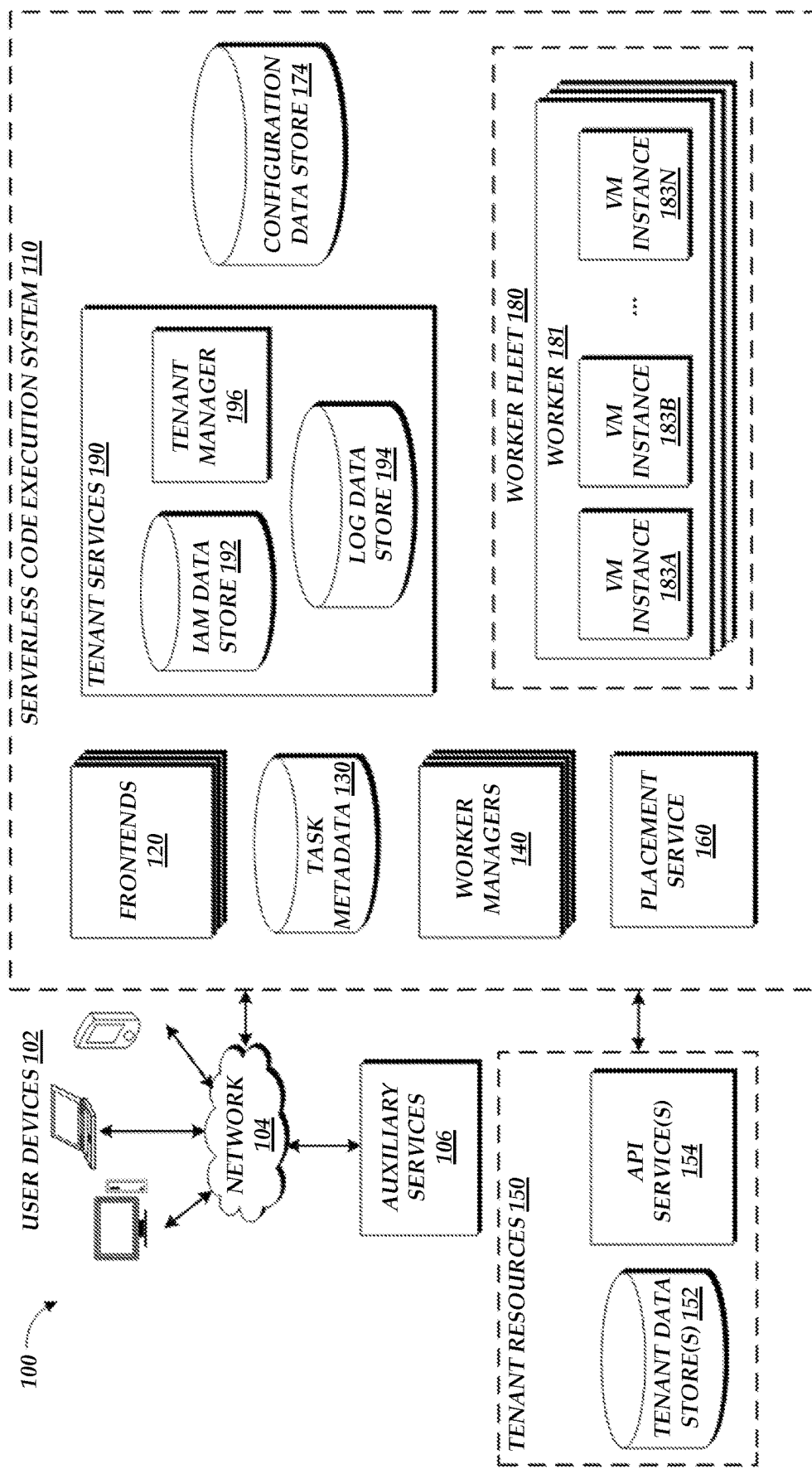
FIG. 1 is a block diagram depicting an illustrative environment in which a serverless code execution system can provide for a multi-tenant mode of serverless code execution.

Generally, aspects of the present disclosure relate to serverless code execution and, in a particular example, a software as a service (SaaS) model hosted (at least partially) in a serverless code execution system. Serverless code execution systems can group together invocations that occur under a same account (or under a same account and for each function, or variation thereof) for efficiency purposes. Typically, there is not a security concern, as all invokes for a specific account can be assumed to share trust among one another. In the SaaS use case, all calls may be under the same account (the SaaS provider, referred to as "SaaS provider" or "tenant of serverless code execution system"), but it may be desirable to separate the calls. For instance, a calling party may not be the SaaS provider, but instead an end user of the SaaS provider (referred to as "sub-tenant" or "sub-tenants"). Alternatively, the SaaS provider may call a service on behalf of the end user. This application allows invocations to be grouped according to the SaaS end user, thus providing increased security when using serverless functions to provide SaaS resources.

The SaaS providers may define and invoke code without needing to own or manage servers by using, e.g., a serverless code execution system (which may itself be operated by another SaaS provider). In this context, the SaaS provider may act as a "second level" SaaS provider, providing software as a service utilizing a SaaS service provided by another SaaS provider, like a cloud services provider. Generally, as a first approach for providing a SaaS platform, the SaaS provider could define a single serverless function hosted by the serverless code execution system to serve each sub-tenant using a same serverless function in execution environments (which could be, e.g., VM instances or containers (with appropriate software packages)), but there may be a possibility of data persistence between separate calls to a same execution environment, thereby possibly exposing persistent data to unauthorized entities. For instance, if the SaaS provider uses a non-differentiated function on their account of the serverless code execution system, the serverless code execution system may use an idle environment (referred to as "warm") for each call, therefore the SaaS provider does not incur higher costs to run the SaaS platform on the serverless execution environment (e.g., greater efficiency), and the serverless execution environment does not incur a high overhead of creating a new environment, which makes execution both faster and more efficient. In this case, the SaaS provider also enjoys the faster and more efficient execution of the serverless function. Therefore, this approach may offer higher operational efficiency and better utilization of infrastructure but could introduce security concerns. For instance, the serverless code execution system may generally be configured to provide isolation between functions, which functions may themselves be associated with a respective user account. Accordingly, by providing isolation between functions, the serverless code execution system may provide isolation between data of different accounts. Under this scenario, a SaaS provider using a single non-differentiated function may service calls for multiple end users with the same function, and thus without isolation between those calls. Accordingly, if a vulnerability existed within the function, inherent security provided by the serverless code execution system may be bypassed, and malicious requests might be able to access the service code or state used to process requests from other sub-tenants of the SaaS provider (thereby possibly exposing other sub-tenant data) and increases the attack surface as the service can have permissions to access data for all the sub-tenants of the SaaS provider. However, data nondisclosure between the various sub-tenants may be highly valued. As an alternative second approach, the SaaS provider could define dedicated infrastructure per sub-tenant on the serverless code execution system to serve each sub-tenant using their respective dedicated infrastructure. This would help minimize the security concerns but would result in increased operational complexity and poor utilization of infrastructure. Therefore, neither approach is satisfactory.

On the other hand, systems and methods of the present disclosure may enable the serverless code execution system to support a multi-tenant mode for serverless functions of a multi-tenant platform (for SaaS providers) on the serverless code execution system. Generally, a multi-tenant mode for serverless functions may utilize a shared model to build multi-tenanted applications (therefore avoiding dedicated infrastructure per sub-tenant), while minimizing the security concerns by provisioning a fresh execution environment to process requests from each sub-tenant using sub-tenant-specific execution environments (therefore avoiding exposing persistent data to unauthorized entities). Furthermore, multi-tenant mode of the serverless code execution system may manage credentials corresponding to a requesting sub-tenant, so that the invoked serverless function may access other tenant-level services that support multi-tenant architectures, such as Amazon™'s DynamoDB or other databases. With multi-tenant mode, an attacker cannot persist beyond the sub-tenant-specific execution environment and will not have permissions to access data for other sub-tenants (whether persistent data or in other tenant-level services).

Generally, SaaS providers may provide software services to end users. For instance, SaaS providers may provide software services on a subscription basis, or as a part of being a customer of a SaaS provider. In particular, certain services offered by SaaS providers may be hosted on the serverless execution environment as serverless functions. In this case, the SaaS providers may be a direct user (e.g., a customer) of the serverless execution environment (referred to as "tenants"), while end users of the SaaS providers may be sub-tenants of SaaS providers with respect to the serverless execution environment. In this manner, the serverless execution environment may provide sub-tenants the services of the serverless functions, as defined and uploaded by the SaaS providers to the serverless execution environment. In some cases, the sub-tenants of the SaaS providers may be enterprise end users (e.g., for an entity) that have their own sub-tenants (e.g., users associated with the entity, referred to as sub-sub-tenants). Generally, the serverless execution environment may handle calls from sub-sub-tenants of SaaS providers on a sub-sub-tenant basis or as-if the sub-sub-tenants are requesting calls on behalf of the enterprise end user (sub-tenant).

Generally, the serverless code execution system may manage execution of code on an on-demand basis. Furthermore, the serverless code execution system may provide a network-accessible service enabling users (e.g., developers of the SaaS providers) to submit or designate computer-executable code to be executed by execution environments on the serverless code execution system. Each set of code on the serverless code execution system may define a "function," and implement specific functionality corresponding to that function when executed on an execution environment of the serverless code execution system. Individual executions of code of the function on the serverless code execution system may be referred to as an "execution" of the function. The serverless code execution system can further enable users to trigger execution of a function based on a variety of potential events, such as transmission of an application programming interface ("API") call or a specially formatted hypertext transport protocol ("HTTP") packet. Thus, users (generally) or sub-tenants (of SaaS providers in particular) may utilize the serverless code execution system to execute any specified executable code "on-demand," without requiring configuration or maintenance of the underlying hardware or infrastructure on which the code is executed. Further, the serverless code execution system may be configured to execute functions in a rapid manner (e.g., in under 100 milliseconds [ms]), thus enabling execution of functions in "real-time" (e.g., with little or no perceptible delay to an end user). To enable this rapid execution, the serverless code execution system can include one or more execution environments that are "pre-warmed" or pre-initialized (e.g., booted into an operating system and executing a complete or substantially complete runtime environment) and configured to enable execution of user-defined code, such that the code may be rapidly executed in response to a request to execute the code, without delay caused by initializing the execution environment. Thus, when an execution of a function is triggered, the code corresponding to that function can be executed within a pre-initialized execution environment in a very short amount of time.

Generally, an "execution environment" may be a virtual machine instance or a container. Containers may be software containers, sometimes referred to as "OS-level virtualization" and hosted on a worker (sometimes referred to as a "host" or "host computing device"). Each execution environment may be divided by a virtualization boundary to ensure data security between respective execution environments. For example, each execution environment may exist within a partitioned user space on the worker, which logically partitions resources of the worker among execution environments on the worker. Each user space may, for example, represent a "chroot" jail.

In accordance with embodiments of the present disclosure, access to network services, such as serverless functions or network resources used by those functions, can be managed by use of identity and access management (IAM) roles and IAM policies. For instance, IAM roles and policies may define access (or not) to computer systems or resources based on an identity of a device requesting access to computer systems or resources. IAM policies may be defined by SaaS providers to indicate which sub-tenants (based on sub-tenant identity or a IAM role of the sub-tenant) may access (or not) computer systems or resources associated with the SaaS providers hosted by the serverless code execution system. In particular, the IAM policies may indicate which sub-tenants may invoke serverless functions associated with the SaaS providers. Moreover, an invoked serverless function may assume the role of a sub-tenant when interacting with network resources, thereby enabling access to sub-tenant-specific network resources.

In aspects of the present disclosure, the serverless code execution system may include one or more data stores including information for a set of IAM policies defining access to a plurality of serverless functions hosted by the serverless code execution system. A set of serverless functions of the plurality of serverless functions may be associated with a SaaS provider. The serverless code execution system may also include a plurality of worker devices hosting a plurality of execution environments. Each execution environment may be associated with a serverless function. A set of execution environments may be associated with the set of serverless functions. The set of execution environments may be partitioned based on sub-tenants of the SaaS provider. Generally, the serverless code execution system may only allow a specific sub-tenant to call a serverless function (per an associated IAM policy) and the serverless code execution system may call the serverless function on an execution environment associated with the that specific sub-tenant. In this manner, the SaaS provider may only need to manage one serverless function (thereby avoiding maintenance costs and additional infrastructure costs), while ensuring data security, as calls of sub-tenants may be portioned among sub-tenant-specific environments (such as use the sub-tenant-specific execution environment for the specific sub-tenant). Therefore, the serverless code execution system may not invoke, for a third party (e.g., another sub-tenant), the same serverless function on the sub-tenant-specific execution environment assigned to the sub-tenant, or serverless code execution system may not invoke, for the sub-tenant, a serverless function on a different sub-tenant-specific execution environment (thereby, increasing data security).

For instance, the serverless code execution system may receive a call to execute a serverless function, where the call includes a serverless function identifier and a sub-tenant identifier, determine a sub-tenant, from any number of sub-tenants, based on the sub-tenant identifier; in response to determining the sub-tenant, identify a sub-tenant-specific execution environment of the set of execution environments that is associated with the sub-tenant, where other calls to execute the serverless function from any of the other sub-tenants are blocked from being invoked on the sub-tenant-specific execution environment; and in response to identifying the sub-tenant-specific execution environment, invoke the serverless function on the sub-tenant-specific execution environment. In this manner, the one or more computing devices of the serverless code execution system may confirm whether a sub-tenant is authorized to access the serverless function and, if so, execute the serverless function on a sub-tenant-specific execution environment in a secure manner. Moreover, as the serverless code execution system may scale down (or up), the SaaS provider may receive the benefits of operational efficiency while maintaining data security.

In at least some embodiments, the serverless functions may try to retrieve data and use services from network resources that are particular to a sub-tenant. However, by default, the execution environments may execute under authentication of the SaaS provider. Providing the SaaS provider access to the sub-tenant-specific resources may reduce security of those resources and may be undesirable. This application provides a solution, whereby sub-tenant-specific execution environments can be authenticated as a sub-tenant (e.g., assume an IAM role of the sub-tenant). This allows those execution environments (and only those execution environments, not other execution environments of other SaaS sub-tenants) to access sub-tenant-specific resources in a secure manner. For instance, the sub-tenant-specific execution environment may interact with one or more tenant services to access sub-tenant data, in accordance with an authentication token indicating the sub-tenant. For instance, the sub-tenant-specific execution environment may assume the role of the sub-tenant using the authentication token to request data and/or services from tenant-level services, such as Amazon™'s DynamoDB. In this manner, the sub-tenant-specific execution environment may only be exposed to sub-tenant-specific information or functionality, as the sub-tenant-specific execution environment may be viewed as the sub-tenant by third party systems. The sub-tenant-specific execution environment may receive the authentication token from a worker that hosts the sub-tenant-specific execution environment, or the worker may modify outbound (e.g., requests from sub-tenant-specific execution environment to other services) to include the authentication token for the sub-tenant-specific execution environment. The authentication token may be based on the sub-tenant identifier and may modify session tags of the sub-tenant-specific execution environment. Moreover, in certain embodiments, the serverless code execution system may be a multi-tenant cloud services provider that maintains a set of execution environments. Each execution environment may be associated with a serverless function. The serverless function may be associated with a software as a service (SaaS) provider that is a tenant of the cloud services provider. The SaaS provider may provide services to a plurality of sub-tenants. The set of execution environments may be partitioned based on sub-tenants of the SaaS provider. In response to receiving a call to execute a serverless function, where the call includes a serverless function identifier and a sub-tenant identifier; the system may identify a sub-tenant-specific execution environment of the set of execution environments that is associated with the sub-tenant identifier; and invoke the serverless function on the sub-tenant-specific execution environment.

The serverless code execution system, to identify the sub-tenant-specific execution environment associated with the sub-tenant, may determine whether any execution environment of the set of execution environments are associated with the sub-tenant identifier. In this manner, the serverless code execution system may condition access based on sub-tenant identifier. Moreover, the serverless code execution system may determine whether any execution environment of the set of execution environments are associated with the sub-tenant identifier and the serverless function identifier. In this manner, the serverless code execution system may still condition access based on sub-tenant identifier, but also ensure the execution environment is defined to perform the serverless function (e.g., is capable of being updated to execute the corresponding code, or already has the corresponding code). Furthermore, the serverless code execution system may determine whether any execution environment of the set of execution environments are associated with the sub-tenant identifier, the serverless function identifier, and a version identifier. In this manner, the serverless code execution system may still condition access based on sub-tenant identifier, but also ensure the execution environment is defined to perform the correct version of the serverless function (e.g., is capable of being updated to execute the corresponding correct version of the code, or already has the corresponding correct version of the code). For instance, as the serverless code execution system may execute functions in a rapid manner, determining particular execution environments for version and function with respect to sub-tenant may assist in rapidly providing function processing and results.

The serverless code execution system may, in response to determining none of the set of execution environments are associated with the sub-tenant identifier (and/or the serverless function identifier or version identifier), instantiate the sub-tenant-specific execution environment. In this manner, the serverless code execution system may determine none of the set is current assigned to be used by the sub-tenant, so a new sub-tenant-specific execution environment for this particular sub-tenant is needed to be provisioned and used for this sub-tenant. As a part of instantiating a new sub-tenant-specific execution environment, an authentication token (discussed above) may be passed the sub-tenant-specific execution environment (or a worker hosting the sub-tenant-specific execution environment), so that the sub-tenant-specific execution environment assumes the role of the sub-tenant. As discussed above, the authentication token may secure sub-tenant data in third party systems, thereby increasing security of sub-tenant data within the serverless code execution system.

In particular, to instantiate the sub-tenant-specific execution environment, the serverless code execution system may select a non-tenant-specific execution environment in a warm state to be modified into the sub-tenant-specific execution environment, or create the sub-tenant-specific execution environment. For instance, a non-tenant-specific execution environment may be an execution environment that is not a part of any set of execution environments associated with any SaaS provider. Restated, the non-tenant-specific execution environment may be an execution environment that is not associated with a multi-tenant mode of the serverless code execution system. In this manner, the multi-tenant mode may quickly modify an already warm execution environment to invoke the serverless function and server a response. For instance, the warm non-tenant-specific execution environment may be selected as it has a basic configuration to be modified to be used for the sub-tenant-specific execution environment, or the non-tenant-specific execution environment may have various commonalities with a configuration needed to modify one or more parameters, etc. to become the sub-tenant-specific execution environment. In this manner, process time may be decreased and the serverless code execution system may respond more rapidly than if a new sub-tenant-specific execution environment had to be created. In the case a new sub-tenant-specific execution environment has to be created, the serverless code execution system may create a new execution environment as discussed below on a worker and assign the new execution environment to the sub-tenant, so that the new execution environment is a sub-tenant-specific execution environment.

The serverless code execution system may, in response to determining at least one execution environment of the set of execution environments are associated with the sub-tenant identifier (and, optionally, the serverless function identifier and/or the version identifier), select an execution environment of the at least one execution environment to be the sub-tenant-specific execution environment. In this manner, the serverless code execution system may condition access based on at least the sub-tenant identifier and process the call faster than creating a new sub-tenant-specific execution environment. Moreover, of all execution environments associated with the sub-tenant identifier, the serverless code execution system may prefer to select an execution environment that has a same serverless function identifier and a same version identifier, then an execution environment that has a same serverless function identifier and a different version identifier (to be updated to the correct version of the function), and then an execution environment that has a different serverless function identifier and a different version identifier (to be updated to this serverless function and this version thereof). In this manner, serverless code execution system may invoke the serverless function as fast as possible, while making as few modifications to already existing environments associated with the sub-tenant.

In another embodiment, the serverless code execution system may, before selecting the execution environment of the at least one execution environment to be the sub-tenant-specific execution environment, determine whether any of the at least one execution environment are available to handle the request. That is, even if there is at least one execution environment associated with the sub-tenant, only those that are available (e.g., warm and not in use) may be selected from to be invoked.

As will be appreciated by one of skill in the art in light of the present disclosure, the embodiments disclosed herein improve the ability of computing systems, such as serverless compute systems, to support SaaS providers (e.g., tenants of the serverless compute systems) with sub-tenants in a manner that supports generalized functions with restricted access to sub-tenant-specific data or services, thereby providing increased functionality and security. Moreover, the presently disclosed embodiments address technical problems inherent within computing systems; specifically, the difficulties in providing SaaS providers via serverless compute systems. For instance, there may be tradeoffs between efficiency and security. As discussed above, one the one hand, if execution environments are grouped together to serve multiple sub-tenants, the SaaS provider may have less to manage and the serverless code execution system may process calls faster and more efficiently, meanwhile sub-tenant data may be exposed to malicious requests. On the other hand, using isolated execution environments may provide stronger data security, while requiring higher infrastructure utilization and maintenance. These technical problems are addressed by the various technical solutions described herein, including a cloud computing service configured to provide sub-tenant-specific execution environments. Thus, the present disclosure represents an improvement on serverless code execution systems and computing systems in general.

The foregoing aspects and many of the attendant advantages of this disclosure will become more readily appreciated as the same become better understood by reference to the following description, when taken in conjunction with the accompanying drawings.

FIG. 1 is a block diagram of an illustrative operating environment 100 in which client devices 102 may interact with a serverless code execution system 110 via a network 104. By way of illustration, various example client devices 102 are shown in communication with the serverless code execution system 110, including a desktop computer, laptop, and a mobile phone. In general, the client devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless code execution system 110 may provide the user computing devices 102 with one or more user interfaces, command-line interfaces (CLI), application programming interfaces (API), and/or other programmatic interfaces for generating and uploading user-executable source code (e.g., as part of a disk image), invoking the user-provided source code (e.g., submitting a request to execute the source code on the serverless code execution system 110), scheduling event-based code executions or timed code executions, tracking the user-provided source code, and/or viewing other logging or monitoring information related to their requests and/or source code. Although one or more embodiments may be described herein as using a user interface, it should be appreciated that such embodiments may, additionally or alternatively, use any CLIs, APIs, or other programmatic interfaces.

The illustrative environment 100 further includes one or more auxiliary services 106, which can interact with the serverless code execution system 110 to implement desired functionality on behalf of a user. Auxiliary services 106 can correspond to network-connected computing devices, such as servers, which generate data accessible to the serverless code execution system 110 or otherwise communicate to the serverless code execution system 110. For example, the auxiliary services 106 can include web services (e.g., associated with the user computing devices 102, with the serverless code execution system 110, or with third parties), databases, really simple syndication ("RSS") readers, social networking sites, or any other source of network-accessible service or data source. In some instances, auxiliary services 106 may be invoked by code execution on the serverless code execution system 110, such as by API calls to the auxiliary services 106. In some instances, auxiliary services 106 may be associated with the serverless code execution system 110, e.g., to provide billing or logging services to the serverless code execution system 110. In some instances, auxiliary services 106 actively transmit information, such as API calls or other task-triggering information, to the serverless code execution system 110. In other instances, auxiliary services 106 may be passive, such that data is made available for access by the serverless code execution system 110. For example, components of the serverless code execution system 110 may periodically poll such passive data sources, and trigger execution of code within the serverless code execution system 110 based on the data provided. While depicted in FIG. 1 as distinct from the user computing devices 102 and the serverless code execution system 110, in some embodiments, various auxiliary services 106 may be implemented by either the user computing devices 102 or the serverless code execution system 110.

The client devices 102, auxiliary services 106, and serverless code execution system 110 may communicate via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

The serverless code execution system 110 is depicted in FIG. 1 as operating in a distributed computing environment including several computer systems that are interconnected using one or more computer networks (not shown in FIG. 1). The serverless code execution system 110 could also operate within a computing environment having a fewer or greater number of devices than are illustrated in FIG. 1. Thus, the depiction of the serverless code execution system 110 in FIG. 1 should be taken as illustrative and not limiting to the present disclosure. For example, the serverless code execution system 110 or various constituents thereof could implement various Web services components, hosted or "cloud" computing environments, and/or peer to peer network configurations to implement at least a portion of the processes described herein.

Further, the serverless code execution system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

In the example of FIG. 1, the serverless code execution system 110 is illustrated as connected to the network 104. In some embodiments, any of the components within the serverless code execution system 110 can communicate with other components of the serverless code execution system 110 via the network 104. In other embodiments, not all components of the serverless code execution system 110 are capable of communicating with other components of the environment 100. In one example, only the frontends 120 may be connected to the network 104, and other components of the serverless code execution system 110 may communicate with other components of the environment 100 via the frontends 120.

In FIG. 1, users (e.g., developers) of the SaaS provider, by way of user computing devices 102, may interact with the serverless code execution system 110 to provide source code, and establish rules or logic defining when and how such code should be executed on the serverless code execution system 110, thus establishing a "task." In this disclosure, "tasks" and "serverless function" may be used interchangeably. For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless code execution system 110, and request that the serverless code execution system 110 execute the code using one or more execution environments that are managed by the system 110. The serverless code execution system 110 can handle the acquisition and configuration of compute capacity (e.g., containers, instances, etc., which are described in greater detail below) based on the code execution request, and execute the code using the compute capacity. The serverless code execution system 110 may automatically scale up and down based on the volume of request to execute code, thereby relieving the user from the burden of having to worry about over-utilization (e.g., acquiring too little computing resources and suffering performance issues) or under-utilization (e.g., acquiring more computing resources than necessary to run the code, and thus overpaying).

To enable interaction with the serverless code execution system 110, the system 110 includes multiple frontends 120, which enable interaction with the serverless code execution system 110. In an illustrative embodiment, the frontends 120 serve as a "front door" to the other services provided by the serverless code execution system 110, enabling users (via user computing devices 102) to provide, request execution of, and view results of computer executable source code. The frontends 120 include a variety of components to enable interaction between the serverless code execution system 110 and other computing devices. For example, each frontend 120 may include a request interface providing user computing devices 102 with the ability to upload or otherwise communication user-specified code and associated data sets to the serverless code execution system 110 (e.g., in the form of executable code or a disk image) and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the source code specified in the request.

References to source code as used herein may refer to any program code (e.g., a program, routine, subroutine, thread, etc.) written in a specific program language. In the present disclosure, the terms "source code," "user code," and "program code," may be used interchangeably. Source code which has been compiled for execution on a specific device is generally referred to herein as "machine code." Both "source code" and "machine code" are representations of the same instructions, which may be collectively referred to as "code." Such code may be executed to achieve a specific function, for example, in connection with a particular web application or mobile application developed by the user. As noted above, individual collections of code (e.g., to achieve a specific function) are referred to herein as "tasks" or "functions," while specific executions of that code are referred to as "task executions," "function executions," "code executions," or simply "executions." Source code for a task may be written, by way of non-limiting example, in JavaScript (e.g., node.js), Java, Python, and/or Ruby (and/or another programming language). Tasks may be "triggered" for execution on the serverless code execution system 110 in a variety of manners. In one embodiment, a user or other computing device may transmit a request to execute a task may, which can generally be referred to as "call" to execute of the task (e.g., a "task call," a "function call," etc.). Such calls may include an identifier of the task to be executed and one or more arguments to be used for executing the task. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a task, an end user may submit (e.g., to a frontend 120) for the task and associated data to be used to execute the task. In one embodiment, the code is provided in the form of an executable code file or a disk image containing the code and other data that the code may use during execution. Illustratively, creation of a task may result in the frontend 120 creating metadata for the task, which defines for example the user creating the task, the executable code file/the disk image used to facilitate execution of the task, trigger conditions for the task, and the like. In one embodiment, tasks may be versioned, with task metadata identifying the available versions and at least some other metadata for a task may vary across versions. For example, different versions may be associated with different executable code files or disk images. Metadata is illustratively stored in the task metadata store 130.

On submitting an executable code file or a disk image, the executable code file or image is illustratively stored (e.g., by the frontend 120) in the configuration data store 174. In one embodiment, each executable code file is stored as a text file. In another embodiment, each image is stored as a set of layers and a manifest identifying the layers making up the disk image. Separate storage of layers and a manifest may enable, for example, deduplication of layers. For example, where two images share a layer, the configuration data store 174 may store only a single copy of that layer. Deduplication may be conducted, for example, based on a digital fingerprint of a layer. Illustratively, each layer may be identified in the store 174 based on a digital fingerprint, such as a hash value, message authentication code (MAC) or the like, which fingerprint is calculable based on the contents of the layer. Accordingly, when two layers share a fingerprint, the system 110 may conclude that the two layers are identical and thus store only a single copy of that layer. As noted above, layers may associated with software that is versioned, such that a first layer corresponds to a first version of software and a second layer corresponds to a second version of software. For ease of reference, the present disclosure refers to such layers as themselves being versioned. However, while the system 110 may in some cases maintain versioning information for layers directly, it may additionally or alternatively maintain versioning information for software, along with information mapping such software versions to particular layers (e.g., a first layer corresponds to version 1 of a particular software, a second layer corresponds to version 2, etc.). In some cases, each disk image is additionally or alternatively stored as an unlayered image, such as one or more files providing a block-level representation of a file system. For example, the system 110 may "flatten" a layered disk image by using the layers to create a file system, and then saving a non-layered representation of that file system to the configuration data store 174. In some cases, the non-layered representation may be divided into a number of distinct chunks, which may be deduplicated within the data store 174. Generation and handling of file system chunks is discussed in more detail in U.S. patent application Ser. No. 17/105,250, filed Nov. 25, 2020 and entitled "LOW LATENCY ACCESS TO DATA SETS USING SHARED DATA SET PORTIONS" (the "'250 Applications") the entirety of which is hereby incorporated by reference.

Both the task metadata store 130 and the configuration data store 174 can correspond to any persistent data store. In one embodiment, the task metadata store 130 and the configuration data store 174 are implemented as logical storage on a cloud storage service, such as an object storage system. An example of such an object storage system is AMAZON™'s SIMPLE STORAGE SERVICE™ (or "S3™").

After a user has created a task on the serverless code execution system 110, the system 110 may accept calls to execute that task. To calls to execute a task, the frontend 120 can include an execution queue, which can maintain a record of requested task executions. Illustratively, the number of simultaneous task executions by the serverless code execution system 110 is limited, and as such, new task executions initiated at the serverless code execution system 110 (e.g., via an API call, via a call from an executed or executing task, etc.) may be placed on the execution queue and processed, e.g., in a first-in-first-out order. In some embodiments, the serverless code execution system 110 may include multiple execution queues, such as individual execution queues for each user account. For example, users of the serverless code execution system 110 may desire to limit the rate of task executions on the serverless code execution system 110 (e.g., for cost reasons). Thus, the serverless code execution system 110 may utilize an account-specific execution queue to throttle the rate of simultaneous task executions by a specific user account. In some instances, the serverless code execution system 110 may prioritize task executions, such that task executions of specific accounts or of specified priorities bypass or are prioritized within the execution queue. In other instances, the serverless code execution system 110 may execute tasks immediately or substantially immediately after receiving a call for that task, and thus, the execution queue may be omitted.

As noted above, tasks may be triggered for execution at the serverless code execution system 110 based on explicit calls from user computing devices 102 (e.g., as received at a request interface). In some embodiments when SaaS providers are tenants and end users of the SaaS providers are sub-tenants, calls may not be sent from an entity that owns a specific task. For instance, the tasks may be owned by SaaS providers, and sub-tenants may transmit calls to the serverless execution system 110 to invoke the tasks. Alternatively or additionally, tasks may be triggered for execution at the serverless code execution system 110 based on data retrieved from one or more auxiliary services 106. To facilitate interaction with auxiliary services 106, the frontend 120 can include a polling interface, which operates to poll auxiliary services 106 for data. Illustratively, the polling interface may periodically transmit a request to one or more user-specified auxiliary services 106 to retrieve any newly available data (e.g., social network "posts," news articles, files, records, etc.), and to determine whether that data corresponds to user-established criteria triggering execution a task on the serverless code execution system 110. Illustratively, criteria for execution of a task may include, but is not limited to, whether new data is available at the auxiliary services 106, the type or content of the data, or timing information corresponding to the data. In some instances, the auxiliary services 106 may function to notify the frontend 120 of the availability of new data, and thus the polling service may be unnecessary with respect to such services.

In addition to tasks executed based on explicit user calls and data from auxiliary services 106, the serverless code execution system 110 may in some instances operate to trigger execution of tasks independently. For example, the serverless code execution system 110 may operate (based on instructions from a user) to trigger execution of a task at each of a number of specified time intervals (e.g., every 10 minutes).

The frontend 120 can further includes an output interface configured to output information regarding the execution of tasks on the serverless code execution system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

Code executions triggered on the serverless code execution system 110 of FIG. 1 are executed by execution environments hosted by a set of workers 181 within a worker fleet 180. Each worker 181 is illustratively a host device configured to host multiple execution environments, which in FIG. 1 are virtual machine instances 183A-N. Execution environments may alternatively include software containers, sometimes referred to as "OS-level virtualization," another virtualization technology known in the art. Thus, where references are made herein to VM instances 183, it should be understood that (unless indication is made to the contrary) a container may be substituted for such instances 183.

As shown in FIG. 1, each worker 181 may host a number of instances 183. Each instance 183 may be isolated from other instances 183, thus ensuring the security of code executions on the serverless code execution system 110. For example, each instance 183 may be divided by a virtualization boundary, by virtue of the instance 183 being a virtual machine hosted by the worker 181. In addition, each instance 183 may exist within a partitioned user space on the worker 181, which logically partitions resources of the worker 181 among instances 183. Each user space may, for example, represent a "chroot" jail—a known isolation technique for LINUX™ operating systems.

To facilitate rapid execution of code, each worker 181 may be configured to maintain a set of instances 183 in a "pre-warmed" state, being at least partially configured to begin execution of code. For example, instances may be created on the worker and configured with access to computing resources (CPU, RAM, drive storage, etc.). In some cases, it may be impractical or impossible to maintain instances 183 in a fully warmed state for all possible code executions, as executions may be associated with a wide variety of at least partially distinct data sets (e.g., executable code files, disk images, and/or snapshots). Thus, instances 183 may be maintained in a "greatest commonality" for a given group of tasks, such as being provisioned with a set of computing resources common to those tasks, being configured to accept an operating system type used by those tasks, etc.

On receiving instructions to provision an instance 183 to support execution of the task, the worker 181 may adjust the configuration of the instance 183 to support that execution. Specifically, the worker 181 may provision the instance 183 with access to an executable code file, a disk image, or snapshot corresponding to the task. In some instances, the worker 181 may retrieve the disk image from the configuration data store 174 and store the full image locally. In other instances, the worker 181 may provide to an instance 183 what appears to be full local access to the disk image or snapshot, while "lazily" retrieving portions of that image or snapshot in response to a request to read such portions. Techniques for providing lazy retrieval of image portions are discussed in the '250 Applications, incorporated by reference above.

In addition, the system 110 includes a number of components for facilitating distribution of calls to execute a task from frontends 120 to particular VM instances 183. For example, the serverless code execution system 110 includes one or more worker managers 140 configured to manage execution environments (e.g., virtual machine instances) hosted by workers 181 among a worker fleet 180. The worker managers 140—each of which are illustratively implemented as physical or virtual-on-physical devices— illustratively "lease" particular VM instances 183 within the fleet 180, thus gaining operational control to, for example, instruct virtual machine instances 183 to execute code of the task. Thus, on receiving a call to execute a task, a frontend 120 may distribute the call to a worker manager 140, which may identify a currently-leased VM instance 183 in which to implement the task, and cause the instance 183 to implement the task. Example interactions for distributing a call from a frontend 120 to a worker manager 140 are described, for example, in U.S. Pat. No. 10,942,795 to Yanacek et al, entitled "SERVERLESS CALL DISTRIBUTION TO UTILIZE RESERVED CAPACITY WITHOUT INHIBITING SCALING" (the "'795 patent"), the entirety of which is hereby incorporated by reference.

In the instance that a worker manager 140 does not currently lease a VM instance 183 corresponding to the called task, the worker manager 140 can contact a placement service 160 to request a lease on an additional instance 183, which is illustratively configured to grant to the worker managers 140 leases to individual VM instances 183. Illustratively, the placement service 160 may maintain state information for VM instances 183 across the fleet 180, as well as information indicating which manager 140 has leased a given instance 183. When a worker manager 140 requests a lease on an additional instance 183, the placement service 160 can identify an appropriate instance 183 (e.g., warmed with software and/or data required to support a call to implement a task) and grant to the manager 140 a lease to that instance 183. In the case that such an instance 183 does not exist, the placement service 160 can instruct a worker 181 to create such an instance 183 (e.g., by creating an instance 183 or identifying an existing unused instance 183, storing an appropriate data manifest for a required executable code file, disk image, snapshot, etc. in a user space of that instance 183, and configuring a file system process to provide access to the required data set) thereafter grant to the worker manager 140 a lease to that instance 183, thus facilitating execution.

In accordance with embodiments of the present disclosure, the serverless code execution system 110 further includes a tenant service 190 configured to manage a multi-tenant mode of the serverless code execution system 110. Specifically, the tenant service 190 includes an identity and access management (IAM) data store 192, a log data store 194, and a tenant manager 196. The serverless code execution system 110, in accordance with the multi-tenant mode, may also interact with tenant resources 150. The tenant resources 150 may include tenant data store(s) 152 and API service(s) 154. In some embodiments, the tenant service 190 may be a part of the frontends 120, or may be hosted near to the frontends 120 to minimize latency to support the functions of the frontends 120.

The tenant manager 196 illustratively represents a computing device configured to manage multi-tenant mode serverless functions on the system 110. As described in more detail below, the tenant manager 196 may (1) manage access to serverless functions, and (2) manage metrics associated with use of the system 110. For instance, the tenant manager 196 may manage access to serverless functions in accordance with the IAM data store 192 and/or the metrics associated with use of the system 110. Furthermore, the tenant manager 196 may manage the metrics associated with use of the system 110 by tracking sub-tenant-specific VM instances (see, e.g., journal below), and tracking log data indicating system performance and use of the system 110 (see, e.g., log data below). Moreover, as discussed in more detail below, the tenant manager 196 may provide session tags to instantiated sub-tenant-specific VM instances. The session tags may include sub-tenant-specific session tags that correspond to the particular sub-tenant that requested a serverless function. The sub-tenant-specific session tags may include a sub-tenant identifier. The sub-tenant-specific tags may be authentication tokens. The sub-tenant-specific session tags may be used to modify execution role permissions of the sub-tenant-specific VM instances, so that outbound requests from the serverless function may be handled as-if the sub-tenant transmitted the request. The metrics may be used determine whether one or more conditions to limit call rates are satisfied based on various criteria. Depending on if one of the conditions are satisfied, the system 110 may determine to limit call rates for serverless functions. Moreover, the system 110 may use the metrics for auditing and reporting. For instance, the system 110 may generate general or specific reports (e.g., per sub-tenant, per SaaS provider, etc.) for SaaS providers.

The IAM data store 192 illustratively includes information for a set of IAM policies. The set of IAM policies may be managed by SaaS provider owners and hosted by the serverless code execution system 110, so that access (or not) to specific compute resources (e.g., storage, functions, serverless functions, etc.) is conditioned based on identity of a requesting device associated with a user (e.g., developer of a SaaS provider) or a sub-tenant. One of skill in the art would recognize that the IAM data store 192 and associated functions performed in accordance with the set of IAM policies may be hosted in a separate system other than the serverless code execution system 110. The set of IAM policies may include, for each SaaS provider or other entity using the serverless code execution system 110, a sub-set of policies to condition access (or not) to serverless functions associated with the SaaS provider or other entity. Generally, the sub-set of policies may include at least one policy to define who may modify, delete, or add new serverless functions associated with the SaaS provider or other entity. Other policies of the sub-set of policies may condition access (or not) to use the various serverless functions in accordance with an identity of a requesting device. In addition, the IAM policies may condition access (or not) based on IAM roles of users or sub-tenants.

The log data store 194 illustratively includes information for a journal and log data. As discussed in more detail below, the journal may track at least sub-tenant-specific VM instances, as the sub-tenant-specific VM instances are instantiated, in use, in a warm state (e.g., ready to be used), or decommissioned. In this way, the journal may indicate whether a sub-tenant-specific VM instance is available (or not) to handle an invocation of a serverless function for a particular sub-tenant requesting invocation of the serverless function. As discussed in more detail below, the log data may store concurrency data of VM instances for SaaS providers or other entities, and telemetry data for each request/response handled by the system 110. The concurrency data may indicate currently warm or in use sub-tenant-specific VM instances and currently warm or in use non-tenant-specific VM instances (e.g., non-multi-mode VM instances that may process non-multi-tenant serverless functions) for each of the SaaS providers or other entities. The telemetry data may indicate response time, load, pendency, sub-tenant/user requestor, etc. of each request/response of the system 110. In this way, and as discussed below, the system 110 may limit request rates on one or more conditions, such as concurrency conditions, load conditions, etc. In some embodiments, the journal may be stored and managed by the worker manager 140, as a part of managing leases. In some embodiments, the log data may be stored and managed by the frontends 120.

The tenant data store(s) 152 may be data repositories to store particular data for SaaS providers or other entities. The tenant data store(s) 152 may be any type of data store and may be hosted within the system 110 or somewhere else (e.g., within a private network associated with the system 110 or outside the private network). In some embodiments, at least some of the tenant data store(s) 152 may store data in multi-tenant architectures, such as Amazon™'s DynamoDB. In this case, those tenant data store(s) 152 may condition access to particular portions of data stored therein based on an identity of a requesting device. For instance, a tenant data store 152 may store data associated with a particular sub-tenant within a larger data structure that stores data associated with other sub-tenants, but may only allow access to the data associated with the particular sub-tenant if a device requesting the data provides a satisfactory identity indicator corresponding to the particular sub-tenant.

Similarly, the API service(s) 154 may be any service to be invoked by sub-tenants, other users, serverless functions, SaaS providers, or other entities. The API service(s) 154 may be hosted within the system 110 or somewhere else (e.g., within the private network associated with the system 110 or outside private network). In some embodiments, at least some of the API service(s) 154 may provide services in multi-tenant architectures. In this case, those API service(s) 154 may condition access to their respective services based on an identity of a requesting device. For instance, a API service 154 may only allow access to the its service if a device requesting the services provides a satisfactory identity indicator corresponding to the particular sub-tenant.

To simplify FIG. 1, the tenant services 150 are depicted as communicating directly with system 110. One of skill in the art would recognize that tenant services 150 may (in total or partially) be included within the system 110, in a separate part of the private network associated with the system 110, or connected to the system 110 by network 104.

Figure 2:
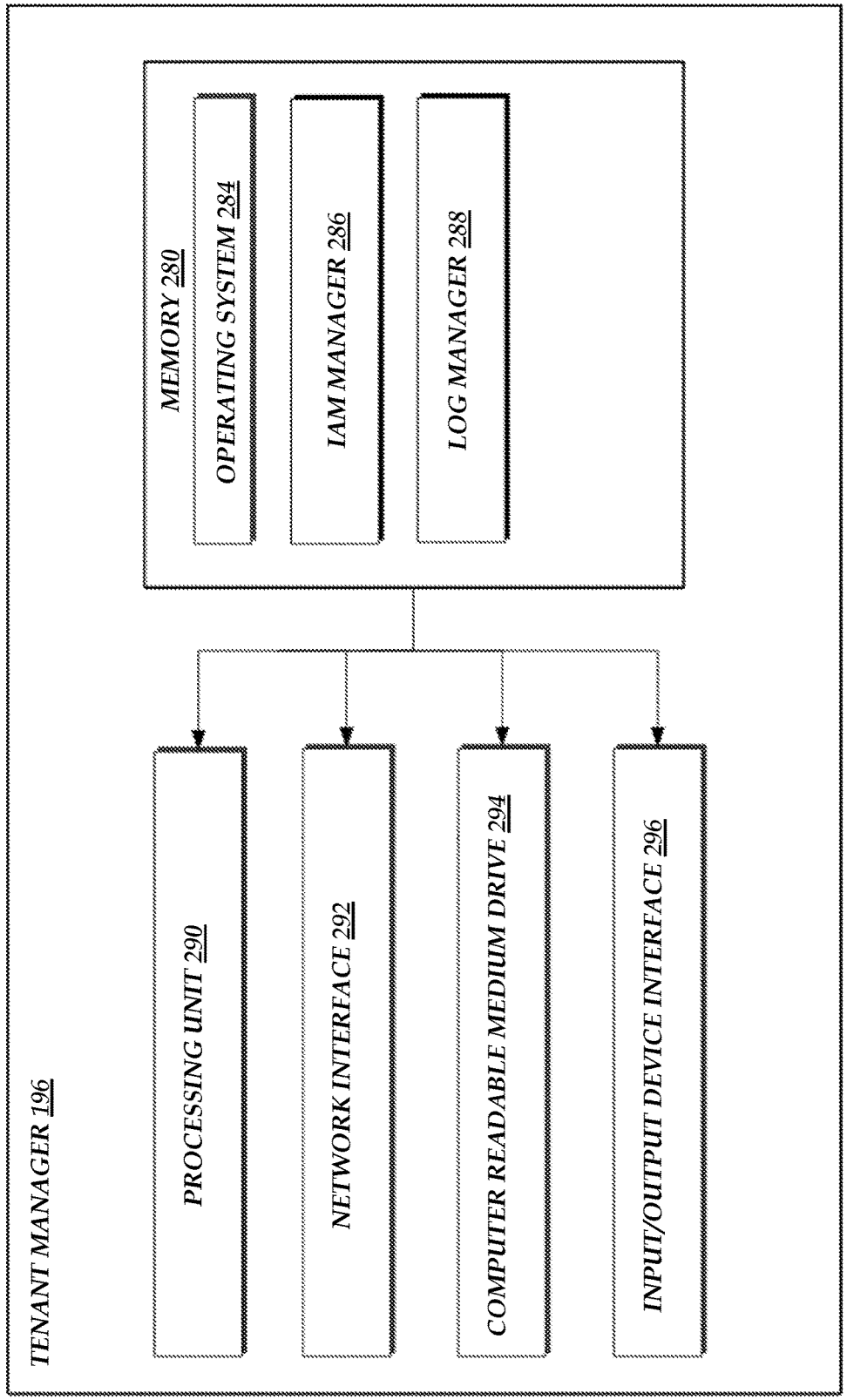
FIG. 2 depicts a general architecture of a computing device providing a tenant manager of FIG. 1, which can provide for a multi-tenant mode of serverless code execution.

FIG. 2 depicts a general architecture of a computing system implementing the tenant manager 196 of FIG. 1. The general architecture of the system depicted in FIG. 2 includes an arrangement of computer hardware and software that may be used to implement aspects of the present disclosure. The hardware may be implemented on physical electronic devices, as discussed in greater detail below. The system may include many more (or fewer) elements than those shown in FIG. 2. It is not necessary, however, that all of these generally conventional elements be shown in order to provide an enabling disclosure. Additionally, the general architecture illustrated in FIG. 2 may be used to implement one or more of the other components illustrated in FIG. 2 (e.g., a worker 181, a frontend 120, etc.).

As illustrated, the system includes a processing unit 290, a network interface 292, a computer readable medium drive 294, and an input/output device interface 296, all of which may communicate with one another by way of a communication bus. The network interface 292 may provide connectivity to one or more networks or computing systems. The processing unit 290 may thus receive information and instructions from other computing systems or services via the network 104. The processing unit 290 may also communicate to and from memory 280 and further provide output information for an optional display (not shown) via the input/output device interface 296. The input/output device interface 296 may also accept input from an optional input device (not shown).

The memory 280 may contain computer program instructions (grouped as units in some embodiments) that the processing unit 290 executes in order to implement one or more aspects of the present disclosure, along with data used to facilitate or support such execution. While shown in FIG. 2 as a single set of memory 280, memory 280 may in practice be divided into tiers, such as primary memory and secondary memory, which tiers may include (but are not limited to) random access memory (RAM), 3D XPOINT memory, flash memory, magnetic storage, and the like. For example, primary memory may be assumed for the purposes of description to represent a main working memory of the system, with a higher speed but lower total capacity than a secondary memory, tertiary memory, etc.

The memory 280 may store an operating system 284 that provides computer program instructions for use by the processing unit 290 in the general administration and operation of the device 196. The memory 280 may further include computer program instructions and other information for implementing aspects of the present disclosure. For example, in one embodiment, the memory 280 includes an IAM manager 286 representing code executable to manage access to serverless functions, and provide session tags to instantiated sub-tenant-specific VM instances. In addition, the memory 280 includes a log manager 288 representing code executable to manage metrics associated with use of the system 110. In combination, the elements of the memory 280, when executed on the device 200, enable implementation of embodiments of the present disclosure.

The system of FIG. 2 is one illustrative configuration of such a device, of which others are possible. For example, while shown as a single device, a system may in some embodiments be implemented as a logical device hosted by multiple physical host devices. In other embodiments, the system may be implemented as one or more virtual devices executing on a physical computing device. While described in FIG. 2 as a tenant manager 196, similar components may be utilized in some embodiments to implement other devices shown in the environment 100 of FIG. 2.

Figure 3A:
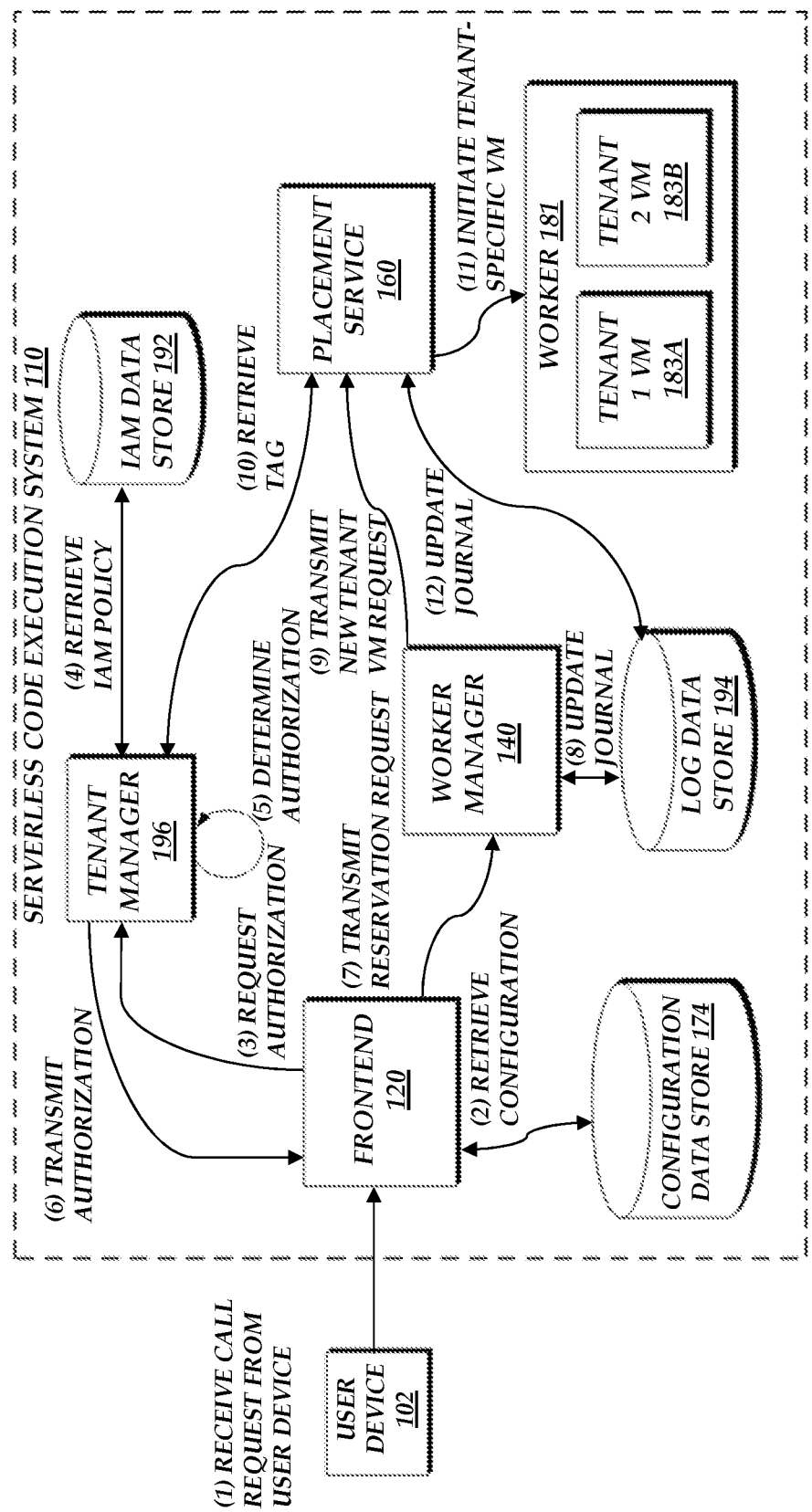
FIG. 3A is a flow diagram depicting illustrative interactions for instantiation of a sub-tenant-specific execution environment.

With reference to FIG. 3A, illustrative interactions are depicted for instantiation of a sub-tenant-specific virtual machine, will be described. The interactions of FIG. 3A assume that a SaaS provider has previously interacted with the serverless code execution system 110 to create a function whose execution is supported by an executable code file or a disk image. For example, the user may provide the disk image in the form of a manifest and set of layers.

The interactions of FIG. 3A begin at (1), where a user device 102 transmits a call request to a frontend 120 and the frontend 120 may receive the call request from the user device 102. The user device 102 may be operated, for example, by an end user associated with a sub-tenant account of a SaaS provider. The user device 102 may be separate and distinct from the SaaS provider, while using services (including serverless functions) of the SaaS provider. Illustratively, the call request may include a serverless function identifier and a sub-tenant identifier (referred to alternatively as "attributes" of the call request). The call request may include other data as well, such as a payload to be used by the serverless function and a return address to which a response is to be sent. The serverless function identifier may indicate a particular serverless function to be invoked. The serverless function identifier may include a version identifier, if multiple versions of the serverless function are supported, that indicates a particular version of the serverless function to be invoked. The serverless function identifier may be a key-value pair, where the value may indicate the serverless function identifier, and the key may indicate this is a request for a serverless function. The sub-tenant identifier may be assigned by the SaaS provider to a sub-tenant account associated with an end user. For instance, the sub-tenant identifier may be a customer identifier or some other unique identifier associated with the sub-tenant account (e.g., associated with an end user). The sub-tenant identifier may include a tenant identifier that indicates a SaaS provider associated with the serverless function. In some embodiments, the sub-tenant identifier may include an enterprise identifier that indicates a tenant of the SaaS provider and a sub-sub-tenant identifier of an end user of the enterprise that is using the SaaS provider. The sub-tenant identifier may be a key-value pair, where the value is the sub-tenant identifier and the key indicates this is a multi-tenant mode serverless function request.

At (2), the frontend 120 may retrieve a configuration from the configuration data store 174. For example, the frontend 120 may retrieve the executable code file, the disk image or the snapshot corresponding to the serverless function identifier (including, possibly, a version identifier), an identifier thereof, or metadata associated therewith from the configuration data store 174. For instance, the frontend 120 may retrieve the metadata to confirm that the serverless function supports a multi-tenant mode. If it does, the frontend 120 may proceed to handle the call request in accordance with the multi-tenant mode; otherwise, the frontend 120 may determine a malformed call request and handle it accordingly (e.g., transmit an error reply and exit the invoke process), or handle the call request as if it were not a multi-tenant mode (thereby ignoring the sub-tenant identifier). The frontend 120 may retrieve the disk image or snapshot to pass the disk image or snapshot to a worker 181 (via various components) to provision a VM instance to be instantiated. Alternatively, the frontend 120 may pass the identifier of the disk image or snapshot to the worker 181 (via various components) so that the worker 181 may retrieve the executable code file, the disk image or the snapshot and provision the VM instance to be instantiated.

At (3), (4), (5), and (6), the frontend 120, the tenant manager 196, and the IAM data store 192 may cooperate to determine whether the call request is authorized to proceed. At (3), the frontend 120 may request authorization from the tenant manager 196. For example, the frontend 120 may pass the serverless function identifier and the sub-tenant identifier to the tenant manager 196. Note, the frontend 120 may also include a request to authorize the caller separate from the call request.

At (4), the tenant manager 196 may retrieve an IAM policy from the IAM data store 192. For example, the tenant manager 196 may determine a particular IAM policy associated with the serverless function identifier from among the set of policies and retrieve the particular IAM policy. For instance, the particular IAM policy may be associated with all serverless functions associated with a SaaS provider, as indicated by the serverless function identifier or the tenant identifier of the sub-tenant identifier. One of skill in the art would recognize that the particular IAM policy may be for a subset of all serverless functions associated with the SaaS provider, or the particular IAM policy may be associated with the sub-tenant identifier. In the case that the particular IAM policy is associated with the serverless function, the particular IAM policy may indicate which sub-tenants may access (or not) the serverless function. In the case that the particular IAM policy is associated with the sub-tenant identifier, the particular IAM policy may indicate which serverless functions the sub-tenant account associated with the sub-tenant identifier may access (or not).

At (5), the tenant manager 196 may determine whether the call request is authorized to proceed. For instance, in a first case, the tenant manager 196 may determine whether the call request is authorized to proceed based on the retrieved IAM policy, the serverless function identifier, and the sub-tenant identifier. For example, the tenant manager 196 may determine whether a sub-tenant identifier is authorized (or not) to access (or not) the serverless function based on the retrieved IAM policy.

In some embodiments, the tenant manager 196 may determine a context of the call request and determine whether the call request is authorized to proceed based on the context, even if the particular IAM policy indicates it may proceed. For instance, the tenant manager 196 may retrieve the concurrency data and the telemetry data (collectively, "context") from the log data store 194 and determine whether on one or more conditions are satisfied to limit request rates. Generally, the one or more conditions may include concurrency conditions, load conditions, pendency conditions, requester conditions, response time conditions, or combinations thereof. As an example, the tenant manager 196 may determine whether a concurrency condition is satisfied if a number of concurrent VM instances (both sub-tenant-specific and non-tenant specific VM instances) associated with a SaaS provider (as indicated by the serverless function identifier or the tenant identifier of the sub-tenant identifier) exceeds a threshold. If a condition of the one or more conditions is satisfied, the tenant manager 196 may determine the call request is not authorized to proceed; if none of the one or more conditions are satisfied, the tenant manager 196 may determine the call request is authorized to proceed. In some embodiments, if the tenant manager 196 determines the call request is not authorized to proceed, the tenant manager 196 may queue the call request and authorize the call request when no conditions are satisfied, or the tenant manager 196 may reject the call request and indicate a general declination to proceed or indicate a particular issue for the declination. In the case the call requested is queued, the call request may time out after a period of time. The tenant manager 196 may queue requests in various manners, such as in first-in-first-out process, on a per sub-tenant basis, on a per tenant basis, or for the entire system 110, depending on the types of the one or more conditions that are satisfied.

At (6), the tenant manager 196 may transmit authorization for the call request to proceed. For example, the tenant manager 196 may transmit the authorization for the call request to proceed when the tenant manager 196 determines the call request is authorized to proceed based on the particular IAM policy and, optionally, the context.

In some embodiments, (2) may be contingent on the determination that the call request is authorized to proceed, that is (2) may not be performed if the call request is not authorized to proceed. In some embodiments, (3), (4), (5), and (6) may be contingent on (2) indicating the requested serverless function is indicated as a multi-tenant mode serverless function, that is (3), (4), (5), and (6) may not be performed if the requested serverless function is indicated as not to be a multi-tenant mode serverless function. In some embodiments, (3), (4), (5), and (6), and (2) may be performed in parallel, and the frontend 120 may only proceed if both the determination that the call request is authorized to proceed and requested serverless function is indicated as a multi-tenant mode serverless function.

At (7), the frontend 120 may transmit a reservation request to a worker manager 140. For example, the frontend 120 may distribute the reservation request from the frontend 120 to the worker manager 140, in a similar manner as discussed above with call requests. The reservation request may include the serverless function identifier and the sub-tenant identifier. The reservation request may include other data, such as instructions based on the context of the call request. The worker manager 140 may receive the reservation request.

At (8), the worker manager 140 may update the journal. For example, the worker manager 140 may write a new entry to the journal in the log data store 194 to indicate a new instantiation of a VM instance associated with the serverless function identifier and the sub-tenant identifier. The new entry may include other data, such as a time stamp or other contextual data.

At (9), the worker manager 140 may transmit a new sub-tenant VM request to the placement service 160. For example, the worker manager 140 may transmit the new sub-tenant VM request to the placement service 160 to contact the placement service 160 to request a lease on an additional instance 183, as discussed above. The new sub-tenant VM request may include the serverless function identifier and the sub-tenant identifier. The placement service 160 may receive the new sub-tenant VM request.

At (10), the placement service 160 may retrieve a tag from the tenant manager 196. For example, the placement service 160 may retrieve a session tag from the tenant manager 196 by providing the sub-tenant identifier to the tenant manager 196; the tenant manager 196 may determine the session tag and return the session tag to the placement service 160. In this manner, the tenant manager 196 ensures data nondisclosure by managing session tags, as the tenant manager 196 may ensure session tags are not repeated concurrently and/or correspond to an authorized entity (e.g., the sub-tenant account, based on a similar process as discussed above with respect to authorization). The tenant manager 196 may generate the session tag when the tenant manager 196 receives the authorization request (e.g., in anticipation of a subsequent contact from the placement service 160), or the tenant manager 196 may generate the session tag when the tenant manager 196 receives the sub-tenant identifier from the placement service 160. The tenant manager 196 or the placement service 160 may update the new entry in the journal with the session tag by updating the journal in the log data store 194. Alternatively, the placement service 160 may generate the session tag based on the sub-tenant identifier and notify the tenant manager 196, so that the tenant manager 196 may, e.g., track and manage session tags without slowing the instantiation process. Alternatively, the frontend 120 may pass the session tag (from the tenant manager 196) to the placement service 160, via transmitting the reservation request to the worker manager 140, who may pass the session tag via the transmitting the new sub-tenant VM request. For instance, the tenant manager 196 may provide the session tag when indicating authorization to proceed with the serverless function. In some embodiments, the IAM policy may be dynamically executed by the tenant manager 196 to provide the session tag. For instance, in response to a IAM request to retrieve the session tag (e.g., to assume the role of the sub-tenant), the tenant manager 196 may execute a dynamic policy based on a parameter (e.g., the sub-tenant identifier) of the IAM request. In this manner, the scale of the sub-tenants supported by the SaaS provider may not be limited by generation of the IAM policy or updates subsequent thereto.

At (11), the placement service 160 may instantiate a sub-tenant-specific VM instance. For example, the placement service 160 may identify an appropriate instance 183 (e.g., warmed with software and/or data required to support a call to implement a task) and grant to the manager 140 a lease to that instance 183. The placement service 160 may not select a warm instance 183 that is already assigned as a sub-tenant-specific VM instance 183, but may select a warm instance that is not assigned as a sub-tenant-specific instance 183 that has an appropriate software and/or data that can updated to execute the specific configuration for the serverless function. In the case that such an instance 183 does not exist, the placement service 160 can instruct a worker 181 to create such an instance 183, as discussed above, and grant to the worker manager 140 a lease to that instance 183. In either case, the placement service 160 may assign the identified instance 183 or the created instance 183 as a sub-tenant-specific VM instance 183 associated with the sub-tenant identifier, and pass the session tag to the sub-tenant-specific VM instance 183 to modify the temporary credentials of sub-tenant-specific VM instance with the session tag. In this manner, when the sub-tenant-specific VM instance 183 is invoked, the sub-tenant-specific VM instance 183 may assume the role of the sub-tenant when transmitting outbound requests to other services, such as the tenant resources 150.

At (12), the placement service 160 (or the worker 181) may update the journal to indicate the identity of the sub-tenant-specific VM instance 183. Therefore, the journal may be updated to identify which sub-tenant-specific VM instance 183 are currently assigned to specific sub-tenants, as the sub-tenant-specific VM instances 183 are instantiated, in use, or idle. Additionally or alternatively, the placement service 160 (or the worker 181) may notify the frontend 120 when the sub-tenant-specific VM instance 183 is ready.

Figure 3B:
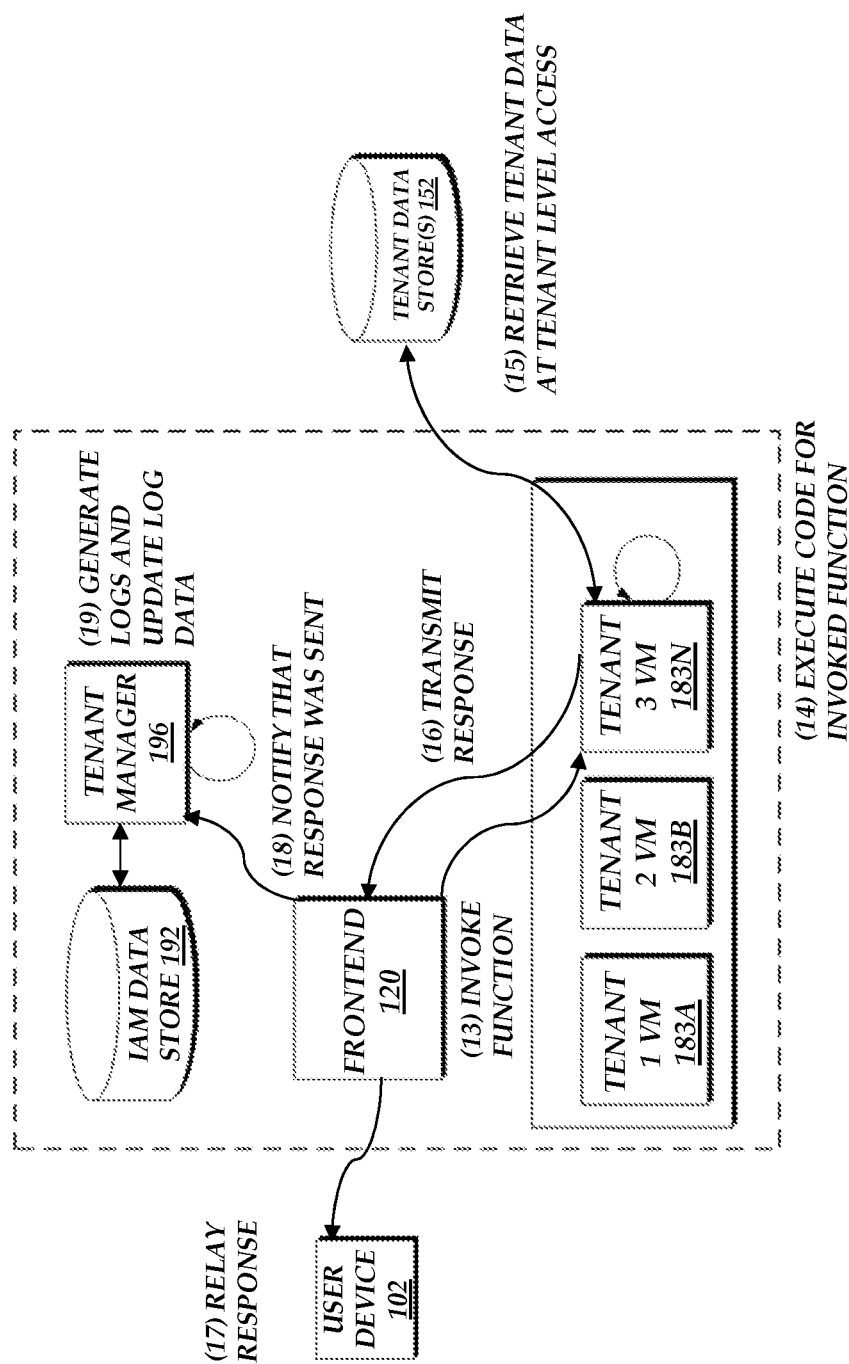
FIG. 3B is a flow diagram depicting illustrative interactions for invoking a sub-tenant-specific execution environment.

With reference to FIG. 3B, illustrative interactions are depicted for invoking a sub-tenant-specific virtual machine, will be described. The interactions of FIG. 3B assume that a previous call request has previously been transmitted by a user device 102 and the interactions of FIG. 3A have occurred. In some embodiments, the interactions of FIG. 3B follow immediately after the interactions of FIG. 3A, that is to invoke the sub-tenant-specific VM instance 183 that was instantiated to serve that specific call request.

In other embodiments, the interactions of FIG. 3B may occur after that specific call request was handled by at least one sub-tenant-specific VM instance 183 assigned to the sub-tenant identifier and a subsequent call request from a same sub-tenant is received. In that case, the frontend 120 may, before transmitting a reservation request as in (7), or retrieving a configuration as in (2), determine whether at least one sub-tenant-specific VM instance 183 assigned to the sub-tenant identifier and/or the serverless function identifier, and whether any of the at least one sub-tenant-specific VM instance 18 are available (e.g., warm and not in use) to handle the subsequent call request. For instance, to determine whether at least one sub-tenant-specific VM instance 183 is assigned to the sub-tenant identifier and/or the serverless function identifier, the frontend 120 may search the journal to determine whether any sub-tenant-specific VM instance 183 is associated with the sub-tenant identifier and the serverless function identifier. To determine whether the sub-tenant-specific VM instances 183 (if present) are available, the frontend 120 may determine if the sub-tenantspecific VM instances 183 are warm (e.g., ready), not in use, and not decommissioned. If the sub-tenant-specific VM instances 183 are available, the frontend 120 (or a worker manager 140, or other component of system 110) may select one of sub-tenant-specific VM instances 183 that are available to handle the subsequent call request. If the sub-tenant-specific VM instances 183 are not available (e.g., all are in use, or have been decommissioned) or there were no sub-tenant-specific VM instance 183 assigned to the sub-tenant identifier and the serverless function identifier, the frontend 120 may proceed as in FIG. 3A to instantiate a sub-tenant-specific VM instance 183.

The interactions of FIG. 3B begin at (13), where the frontend 120 invokes a serverless function on a sub-tenant-specific VM instance 183. For instance, the frontend 120 may pass a call, in accordance with the call request, to the sub-tenant-specific VM instance 183. The call may include a request in accordance with a framework of the serverless function, as defined by the tenant. For instance, the call may include a payload of data, a request to retrieve particular data, a request to update data based on the payload of data, etc. The sub-tenant-specific VM instance 183 may receive the call from the frontend 120. The frontend 120 may update the journal to indicate the sub-tenant-specific VM instance 183 is in use.

At (14), the sub-tenant-specific VM instance 183 may execute code for the invoked serverless function, in accordance with the executable code file, the disk images and/or the snapshots associated with the serverless function and provided by SaaS provider. Illustratively, at (15), the sub-tenant-specific VM instance 183 may, as a part of executing the code for the invoked serverless function, retrieve sub-tenant data at sub-tenant level access from tenant data store(s) 152. For instance, the sub-tenant-specific VM instance 183 may transmit a request to a tenant data store 152, with a session tag that enables the sub-tenant-specific VM instance 183 to assume the role of the sub-tenant so that the tenant data store 152 provides access to the sub-tenant restricted data. For instance, the tenant data store 152 may check with tenant manager 196 whether an IAM policy associated with the tenant data store 152 authorizes the particular session tag to access the sub-tenant data; if so, the tenant data store 152 may provide access to the sub-tenant data; if not, the tenant data store 152 may deny access to the sub-tenant data. For instance, the code may not include the session tag (or authentication token) in the call to tenant data store(s) 152. Instead, the worker 181 that hosts the VM instance 183 may supplement calls with the session tag (or authentication token), so that the code need not worry about authentication. Alternatively, the code may refer to authentication information generically (e.g., as an environmental variable), and the worker 181 may populate the environment variable with the session tag (or authentication token) as linked to that generic identifier. In this manner, the code may work no matter the session tag (or authentication token).

At (16), the sub-tenant-specific VM instance 183 may transmit a response to the frontend 120. For instance, the sub-tenant-specific VM instance 183 may generate a response in accordance with code for the invoked serverless function and transmit the response to the frontend 120. The frontend 120 may receive the response.

At (17), the frontend 120 may relay the response to the user device 102. For instance, the frontend 120 may repackage the response, so that the response is transmitted to the return address of the user device 102. Alternatively, (16) and (17) may be omitted and the sub-tenant-specific VM instance may transmit the response directly to the user device 102. In this case, the sub-tenant-specific VM instance may notify the frontend 120 or the tenant manager 196 to notify that the response was sent to the user 102.

At (18), the frontend 120 may notify the tenant manager 196 that the response was sent. For instance, the frontend 120 may indicate the response was sent, along with optional data, such as response time, load, pendency, sub-tenant/user requestor. The tenant manager 196 may receive the notice that the response was sent.

At (19), the tenant manager 196 may generate logs and update the log data in log data store 194. For instance, the tenant manager 196 may update the telemetry data. The tenant manager 196 may also update an appropriate journal entry for the sub-tenant-specific VM instance 183, to reflect it is no longer in use.

In some embodiments, the tenant manager 196 may keep (via the workload manager 140 or other component of system 110) the sub-tenant-specific VM instance 183 in a warm state in case the sub-tenant has an additional calls to be processed. Generally, the sub-tenant-specific VM instance 183 may be kept in a warm state until a scale down policy decommissions the sub-tenant-specific VM instance 183. This may be based on various criteria, such as a period of time since a last call request for the serverless function identifier and the sub-tenant identifier, a load of the system 110, a concurrence amount of a tenant, or combinations thereof.

Figure 4:
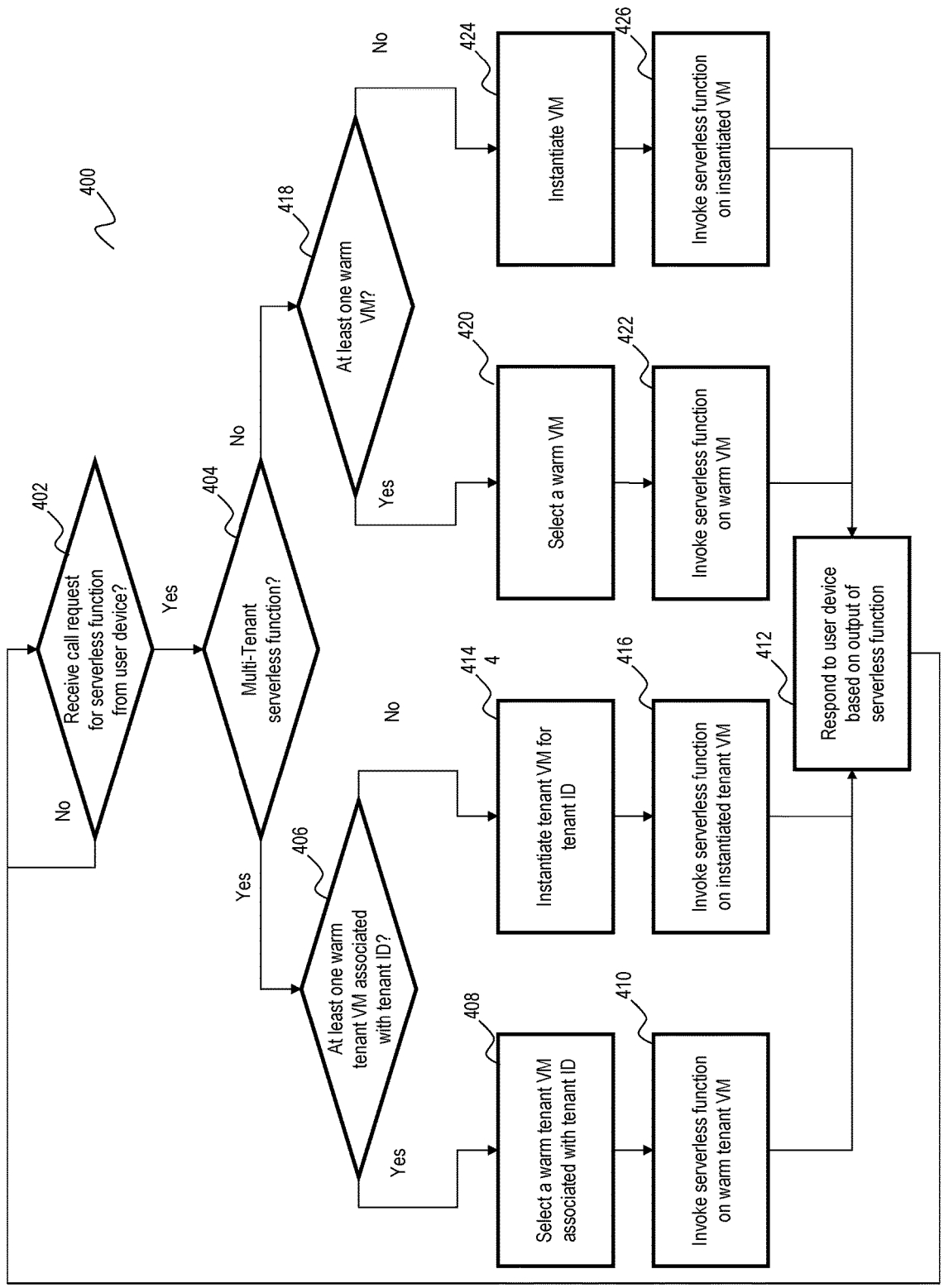
FIG. 4 is a flow chart depicting an illustrative routine for managing calls for serverless functions using sub-tenant-specific execution environments.

With reference to FIG. 4, an illustrative routine 400 for managing calls for serverless functions using sub-tenant-specific virtual machines, will be described. The routine 400 may be implemented, for example, by a serverless code execution system 110, including one or more components of FIG. 1, such as a frontend 120, a worker manager 140, the placement service 160, a worker 181, and the tenant service 190.

The routine 400 begins at block 402, where the system 110 may determine whether a call request for a serverless function from a user device has been received. For example, the frontends 120 may wait for call requests for user devices, but generally, the call requests may be automated from other system components or other systems. Therefore, generally, the frontends 120 may wait for call requests. Generally, each call may be associated with a calling party (e.g., a sub-tenant, a service, a user device, a service, etc. that transmitted the call). In response to determining no call request for a serverless function has been received (block 402: No), the system 110 may return to wait for a call request at block 402.

At block 404, in response to determining a call request for a serverless function has been received (block 402: Yes), the system 110 may determine whether the serverless function is a multi-tenant serverless function. For example, the system 110 may retrieve metadata and determine the serverless function is a multi-tenant serverless function, as discussed above, but generally the system may determine whether the call request indicates a multi-tenant call request.

At block 406, in response to determining the serverless function is a multi-tenant serverless function (block 404: Yes), the system 110 may determine whether there is at least one warm sub-tenant-specific VM associated with a sub-tenant identifier. For example, the system 110 may determine a sub-tenant associated with the call by determining the sub-tenant based on the sub-tenant identifier, and determine whether there is at least one warm sub-tenant-specific VM associated with a sub-tenant identifier and a serverless function identifier, as discussed above. Alternatively, system 110 may automatically instantiate a sub-tenant-specific VM instance 183 for the sub-tenant identifier (e.g., proceed straight to block 414, discussed below) without considering whether there is at least one warm sub-tenant-specific VM associated with a sub-tenant identifier. For instance, in certain embodiments, the system 110 may be able to instantiate a VM for each call and quickly recycle the VM to handle a next call (without exposing sub-tenant data therebetween).

At block 408, in response to determining there is at least one warm sub-tenant-specific VM associated with a sub-tenant identifier (block 406: Yes), the system 110 may select a warm sub-tenant VM associated with the sub-tenant identifier. For example, the system 110 may select a warm sub-tenant-specific VM instance 183 from among the available warm sub-tenant-specific VM instances, in accordance with various criteria, such as age, load, etc.

At block 410, the system 110 may invoke the serverless function on the warm sub-tenant-specific VM. For example, the system 110 may pass a call, in accordance with the call request, to the selected sub-tenant-specific VM instance 183, as discussed above. Upon receiving the call, the sub-tenant-specific VM may execute the associated code (or image). Generally, the sub-tenant-specific VM may already have a session tag (e.g., a currently active session tag, as passed to it during instantiation) or the sub-tenant-specific VM may get passed a session tag (e.g., a new session tag). Therefore, the sub-tenant-specific VM may assume the role of the sub-tenant when executing the associated code, such as when interacting with tenant services 150.

At block 412, the system 110 may respond to the user device based on output of the serverless function. For example, the system 110 may execute the code of the serverless function on the selected sub-tenant-specific VM instance, generate a response, and transmit the response to the user device 102, as discussed above. Note, the response may be to any entity that transmitted the call request and not just user devices. The routine 400 may return to block 402, where the system 110 may determine whether a call request for a serverless function from a user device has been received.

At block 414, in response to determining there is no warm sub-tenant-specific VM associated with a sub-tenant identifier (block 406: No), the system 110 may instantiate a sub-tenant-specific VM instance 183 for the sub-tenant identifier. For example, the system 110 may instantiate a sub-tenant-specific VM instance that has a session tag to assume the role of the sub-tenant when executing the code associated with the serverless function, as discussed above.

At block 416, the system 110 may invoke the serverless function on instantiated sub-tenant-specific VM instance 183. For example, the system 110 may pass a call, in accordance with the call request, to the instantiated sub-tenant-specific VM instance 183, as discussed above. Upon receiving the call, the instantiated sub-tenant-specific VM may execute the associated code (or image). Generally, the instantiated sub-tenant-specific VM may assume the role of the sub-tenant when executing the associated code, such as when interacting with tenant services 150.

The routine 400 may then advance to block 412, in which the system 110 may respond to the user device based on output of the serverless function, and return to block 402, where the system 110 may determine whether a call request for a serverless function from a user device has been received.

At block 418, in response to determining the serverless function is not a multi-tenant serverless function (block 404: No), the system 110 may determine whether there is at least one warm VM. For example, the system 110 may determine whether there is at least one warm non-tenant-specific VM instance 183, as discussed above.

At block 420, in response to determining there is at least one warm VM (block 418: Yes), the system 110 may select a warm VM. For example, the system 110 may select a warm VM instance 183 from among the available warm VM instances that are not warm tenant-specific VM instances, as described above.

At block 422, the system 110 may invoke the serverless function on the warm VM. For example, the system 110 may pass a call, in accordance with the call request, to the selected warm VM instance 183, as discussed above. The routine 400 may then advance to block 412, in which the system 110 may respond to the user device based on output of the serverless function, and return to block 402, where the system 110 may determine whether a call request for a serverless function from a user device has been received.

At block 424, in response to determining there is no warm VM (block 418: No), the system 110 may instantiate a VM instance 183. For example, the system 110 may instantiate a VM instance 183 without a session tag.

At block 426, the system 110 may invoke the serverless function on instantiated VM instance 183. For example, the system 110 may pass a call, in accordance with the call request, to the instantiated VM instance 183, as discussed above. The routine 400 may then advance to block 412, in which the system 110 may respond to the user device based on output of the serverless function, and return to block 402, where the system 110 may determine whether a call request for a serverless function from a user device has been received.

Generally, the system 110 may confirm authorization to proceed with the call request before doing any of blocks 404 to 426. In this manner, the IAM policies may ensure appropriate access to sub-tenant data.

Therefore, the systems and methods of the present disclosure may utilize a shared model to build multi-tenanted applications (therefore avoiding dedicated infrastructure per sub-tenant), while minimizing the security concerns by provisioning a fresh execution environment to process requests from each sub-tenant using sub-tenant specific VM instances or containers (therefore avoiding exposing persistent data to unauthorized entities). Furthermore, multi-tenant mode of the serverless code execution system may manage credentials corresponding to a requesting sub-tenant, so that the invoked serverless function may access other tenant-level services that support multi-tenant architectures.

All of the methods and processes described above may be embodied in, and fully automated via, software code modules executed by one or more computers or processors. The code modules may be stored in any type of non-transitory computer-readable medium or other computer storage device. Some or all of the methods may alternatively be embodied in specialized computer hardware.

Conditional language such as, among others, "can," "could," "might" or "may," unless specifically stated otherwise, are otherwise understood within the context as used in general to present that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y or Z," unless specifically stated otherwise, is otherwise understood with the context as used in general to present that an item, term, etc., may be either X, Y or Z, or any combination thereof (e.g., X, Y and/or Z). Thus, such disjunctive language is not generally intended to, and should not, imply that certain embodiments require at least one of X, at least one of Y or at least one of Z to each be present.

Unless otherwise explicitly stated, articles such as 'a' or 'an' should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Any routine descriptions, elements or blocks in the flow diagrams described herein and/or depicted in the attached figures should be understood as potentially representing modules, segments, or portions of code which include one or more executable instructions for implementing specific logical functions or elements in the routine. Alternate implementations are included within the scope of the embodiments described herein in which elements or functions may be deleted, or executed out of order from that shown or discussed, including substantially synchronously or in reverse order, depending on the functionality involved as would be understood by those skilled in the art.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. A serverless code execution system comprising:
   one or more data stores including information for a set of identity and access management (IAM) policies defining access to a serverless function hosted by the serverless code execution system, wherein the serverless function is associated with a software as a service (SaaS) provider;
   one or more worker devices hosting a set of execution environments, wherein each execution environment is associated with the serverless function, and wherein the set of execution environments are partitioned based on sub-tenants of the SaaS provider; and
   one or more computing devices of the serverless code execution system configured to:
      receive a call to execute a serverless function, wherein the call includes a serverless function identifier and a sub-tenant identifier;
      determine whether the serverless function is configured for a multi-tenant mode of the serverless code execution system based on the serverless function identifier;
      in response to determining the serverless function is configured for the multi-tenant mode of the serverless code execution system, determine whether the call is authorized to proceed based on at least an IAM policy of the set of IAM policies;
      in response to determining the call is authorized to proceed, determine a sub-tenant of the sub-tenants based on the sub-tenant identifier;
      in response to determining the sub-tenant, identify a sub-tenant-specific execution environment of the set of execution environments that is associated with the sub-tenant, wherein other calls to execute the serverless function from other sub-tenants of the sub-tenants are blocked from being invoked on the sub-tenant-specific execution environment; and
      in response to identifying the sub-tenant-specific execution environment, invoke the serverless function on the sub-tenant-specific execution environment.

2. The serverless code execution system of claim 1, wherein the one or more computing devices are further configured to, using the sub-tenant-specific execution environment, interact with one or more tenant services to access sub-tenant data, in accordance with an authentication token indicating the sub-tenant.

3. The serverless code execution system of claim 1, wherein, to identify the sub-tenant-specific execution environment associated with the sub-tenant, the one or more computing devices are further configured to:
   determine whether any execution environment of the set of execution environments are associated with the sub-tenant identifier and the serverless function identifier; and
   in response to determining none of the set of execution environments are associated with the sub-tenant identifier and the serverless function identifier, instantiate the sub-tenant-specific execution environment, wherein, to instantiate the sub-tenant-specific execution environment, the one or more computing devices generate the sub-tenant-specific execution environment with an authentication token so that the sub-tenant-specific execution environment assumes the role of the sub-tenant.

4. The serverless code execution system of claim 3, wherein, to instantiate the sub-tenant-specific execution environment, the one or more computing devices are further configured to select a non-tenant-specific execution environment in a warm state to be modified into the sub-tenant-specific execution environment, or create the sub-tenant-specific execution environment, wherein the one or more computing devices of the serverless code execution system pass the authentication token to the sub-tenant-specific execution environment.

5. A computer-implemented method comprising:
   maintaining, by a multi-tenant cloud services provider, a set of execution environments, wherein each execution environment is associated with a serverless function, wherein the serverless function is associated with a software as a service (SaaS) provider that is a tenant of the cloud services provider, wherein the SaaS provider provides services to a plurality of sub-tenants, wherein the set of execution environments are partitioned based on sub-tenants of the SaaS provider;
   receiving a call to execute a serverless function, wherein the call includes a serverless function identifier and a sub-tenant identifier;
   identifying a sub-tenant-specific execution environment of the set of execution environments that is associated with the sub-tenant identifier; and
   invoking the serverless function on the sub-tenant-specific execution environment.

6. The computer-implemented method of claim 5, further comprising, using the sub-tenant-specific execution environment, interacting with one or more tenant services to access tenant data, in accordance with an authentication token indicating the sub-tenant.

7. The computer-implemented method of claim 5, wherein identifying the sub-tenant-specific execution environment that is associated with the sub-tenant includes:
   determining whether any execution environment of the set of execution environments are associated with the sub-tenant identifier and the serverless function identifier; and
   in response to determining none of the set of execution environments are associated with the sub-tenant identifier and the serverless function identifier, instantiating the sub-tenant-specific execution environment, wherein instantiating the sub-tenant-specific execution environment includes generating the sub-tenant-specific execution environment with an authentication token so that the sub-tenant-specific execution environment assumes the role of the sub-tenant.

8. The computer-implemented method of claim 7, wherein instantiating the sub-tenant-specific execution environment includes selecting a non-tenant-specific execution environment in a warm state to be modified into the sub-tenant-specific execution environment, or creating the sub-tenant-specific execution environment, wherein the sub-tenant-specific execution environment obtains the authentication token based on the sub-tenant identifier.

9. The computer-implemented method of claim 5, wherein identifying the sub-tenant-specific execution environment associated with the sub-tenant includes:
   determining whether any execution environment of the set of execution environments are associated with the sub-tenant identifier and the serverless function identifier; and
   in response to determining at least one execution environment of the set of execution environments are associated with the sub-tenant identifier and the serverless function identifier, selecting an execution environment of the at least one execution environment to be the sub-tenant-specific execution environment.

10. The computer-implemented method of claim 9, further comprising, before selecting the execution environment of the at least one execution environment to be the sub-tenant-specific execution environment, determining whether any of the at least one execution environment are available to handle the call.

11. The computer-implemented method of claim 5, further comprising, before invoking the serverless function on the sub-tenant-specific execution environment, determining whether the call is authorized to proceed based on at least an IAM policy of a set of IAM policies and/or a context of the call.

12. The computer-implemented method of claim 11, wherein determining whether the call is authorized to proceed based on the context includes retrieving contextual data; determining whether one or more conditions are satisfied to limit call rates; and in response to none of the one or more conditions are satisfied, determining the call is authorized to proceed.

13. One or more non-transitory computer-readable media comprising computer-executable instructions that, when executed on a serverless compute system, cause the serverless compute system to:
   maintain, by a multi-tenant cloud services provider, a set of execution environments, wherein each execution environment is associated with a serverless function, wherein the serverless function is associated with a software as a service (SaaS) provider that is a tenant of the cloud services provider, wherein the SaaS provider provides services to a plurality of sub-tenants, wherein the set of execution environments are partitioned based on sub-tenants of the SaaS provider;
   receive a call to execute a serverless function, wherein the call includes a serverless function identifier and a sub-tenant identifier;
   identify a sub-tenant-specific execution environment of the set of execution environments that is associated with the sub-tenant; and
   invoke the serverless function on the sub-tenant-specific execution environment.

14. The one or more non-transitory computer-readable media of claim 13, wherein the sub-tenant-specific execution environment assumes the role of the sub-tenant.

15. The one or more non-transitory computer-readable media of claim 13, wherein the computer-executable instructions further cause the serverless computing system to, using the sub-tenant-specific execution environment, interact with one or more tenant services to access tenant data, in accordance with an authentication token indicating the sub-tenant.

16. The one or more non-transitory computer-readable media of claim 13, wherein, to identify the sub-tenant-specific execution environment associated with the sub-tenant, the computer-executable instructions further cause the serverless computing system to:
   determine whether any execution environment of the set of execution environments are associated with the sub-tenant identifier and the serverless function identifier; and
   in response to determining none of the set of execution environments are associated with the sub-tenant identifier and the serverless function identifier, instantiate the sub-tenant-specific execution environment, wherein instantiating the sub-tenant-specific execution environment includes generating the sub-tenant-specific execution environment with an authentication token so that the sub-tenant-specific execution environment assumes the role of the sub-tenant.

17. The one or more non-transitory computer-readable media of claim 16, wherein, to instantiate the sub-tenant-specific execution environment, the computer-executable instructions further cause the serverless computing system to: select a non-tenant-specific execution environment in a warm state to be modified into the sub-tenant-specific execution environment, or create the sub-tenant-specific execution environment, wherein the sub-tenant-specific execution environment obtains the authentication token based on the sub-tenant identifier.

18. The one or more non-transitory computer-readable media of claim 13, wherein, to identify the sub-tenant-specific execution environment associated with the sub-tenant, the computer-executable instructions further cause the serverless computing system to:
   determine whether any execution environment of the set of execution environments are associated with the sub-tenant identifier and the serverless function identifier; and
   in response to determining at least one execution environment of the set of execution environments are associated with the sub-tenant identifier and the serverless function identifier, select an execution environment of the at least one execution environment to be the sub-tenant-specific execution environment.

19. The one or more non-transitory computer-readable media of claim 18, wherein, before invoking the serverless function on the sub-tenant-specific execution environment, the computer-executable instructions further cause the serverless computing system to: determine whether the call is authorized to proceed based on at least an IAM policy of a set of IAM policies and/or a context of the call.

20. The one or more non-transitory computer-readable media of claim 19, wherein, to determine whether the call is authorized to proceed based on the context, the computer-executable instructions further cause the serverless computing system to retrieve contextual data; determine whether one or more conditions are satisfied to limit call rates; and in response to none of the one or more conditions are satisfied, determine the call is authorized to proceed.

* * * * *